(12) United States Patent
Walczyk et al.

(10) Patent No.: US 12,050,442 B2
(45) Date of Patent: *Jul. 30, 2024

(54) EDGE DEVICES AND GATEWAYS WITH MACHINE LEARNING FOR DETECTING ANOMALIES IN BUILDING EQUIPMENT VIBRATION DATA

(71) Applicant: Tyco Fire & Security GmbH, Neuhausen am Rheinfall (CH)

(72) Inventors: Matthias Walczyk, Duesseldorf (DE); Andrew S. Pike, Santa Cruz, CA (US); John M. Sullivan, Land O Lakes, FL (US); Kelsey C. Schuster, Milwaukee, WI (US); Christopher J. Verink, Glendale, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 110 days.

This patent is subject to a terminal disclaimer.

(21) Appl. No.: 17/726,433

(22) Filed: Apr. 21, 2022

(65) Prior Publication Data

US 2022/0244682 A1    Aug. 4, 2022

Related U.S. Application Data

(63) Continuation-in-part of application No. 16/658,822, filed on Oct. 21, 2019, now Pat. No. 11,422,547.

(51) Int. Cl.
*G05B 13/02*    (2006.01)
*G06F 17/14*    (2006.01)

(52) U.S. Cl.
CPC ......... *G05B 13/027* (2013.01); *G06F 17/142* (2013.01)

(58) Field of Classification Search
CPC .. G05B 23/0254; G05B 13/027; G06N 20/00; G01H 11/00
(Continued)

(56) References Cited

U.S. PATENT DOCUMENTS 1,073,334 A    11/1913    Dickson
7,283,914 B2    10/2007    Poorman et al.
(Continued)

OTHER PUBLICATIONS

He, Yuan, Junchen Guo, and Xiaolong Zheng. "From surveillance to digital twin: Challenges and recent advances of signal processing for industrial internet of things." IEEE Signal Processing Magazine 35.5 (2018): pp. 120-129. (Year: 2018).*

(Continued)

*Primary Examiner* — Satish Rampuria
(74) *Attorney, Agent, or Firm* — Foley & Lardner LLP

(57) ABSTRACT

A system includes a plurality of vibration sensors configured to be coupled to a unit of building equipment, an edge device arranged between the plurality of vibration sensors and a communications network. The edge device is programmed to detect an abnormality in vibration data from the plurality of vibration sensors by ingesting streams of vibration data from the plurality of vibration sensors, performing signal processing on the streams of vibration data to obtain inputs for a machine learning model, determining whether the abnormality is occurring by applying the inputs to the machine learning model, determining a trend associated with the abnormality based on outputs of the machine learning model, and causing a portion of the vibration data to be communicated to a first computing system via the communications network in response to the trend satisfying a criterion.

20 Claims, 18 Drawing Sheets

(58) Field of Classification Search
USPC .................................................. 700/275–285
See application file for complete search history.

(56) References Cited

U.S. PATENT DOCUMENTS

| | | | |
|---|---|---|---|
| 7,640,139 | B2 | 12/2009 | Sahara et al. |
| 7,914,468 | B2 * | 3/2011 | Shalon ................. A61B 5/0006 600/595 |
| 7,937,164 | B2 | 5/2011 | Samardzija et al. |
| 7,940,685 | B1 | 5/2011 | Breslau et al. |
| 9,353,514 | B1 | 5/2016 | Wine et al. |
| 10,564,941 | B2 | 2/2020 | Lucas et al. |
| 10,572,230 | B2 | 2/2020 | Lucas et al. |
| 10,628,135 | B2 | 4/2020 | Sharma et al. |
| 10,977,010 | B2 | 4/2021 | Sharma et al. |
| 11,162,837 | B2 | 11/2021 | Pal et al. |
| 11,762,442 | B1 * | 9/2023 | Merli ...................... H04L 67/12 713/310 |
| 2002/0032544 | A1 | 3/2002 | Reid et al. |
| 2002/0144551 | A1 | 10/2002 | Satsangi |
| 2006/0042177 | A1 | 3/2006 | Lin et al. |
| 2006/0064037 | A1 * | 3/2006 | Shalon ................... G16H 20/60 128/903 |
| 2006/0100797 | A1 * | 5/2006 | Poorman ............ G05B 23/0267 702/56 |
| 2015/0149134 | A1 | 5/2015 | Mehta et al. |
| 2019/0121350 | A1 * | 4/2019 | Cella ...................... G06N 3/006 |
| 2019/0123931 | A1 | 4/2019 | Schuster et al. |
| 2019/0236485 | A1 * | 8/2019 | Stanley, III ........... H04L 67/303 |
| 2020/0077892 | A1 | 3/2020 | Tran |
| 2020/0327371 | A1 | 10/2020 | Sharma et al. |
| 2020/0348662 | A1 | 11/2020 | Cella et al. |
| 2020/0363794 | A1 | 11/2020 | Schuster et al. |
| 2020/0370994 | A1 | 11/2020 | Santarone et al. |
| 2020/0380387 | A1 | 12/2020 | Pourmohammad et al. |
| 2021/0241912 | A1 * | 8/2021 | Chazin ............... G08B 21/0446 |
| 2023/0089205 | A1 * | 3/2023 | Cella ................ G05B 19/41875 702/188 |

OTHER PUBLICATIONS

Krishnamurthy, Lakshman, et al. "Design and deployment of industrial sensor networks: experiences from a semiconductor plant and the north sea." Proceedings of the 3rd international conference on Embedded networked sensor systems. 2005.pp.64-75 (Year: 2005).*

Chen, Yen-Kuang. "Challenges and opportunities of internet of things." 17th Asia and South Pacific design automation conference. IEEE, 2012.pp.383-388 (Year: 2012).*

Antonini, Mattia, et al. "Smart audio sensors in the internet of things edge for anomaly detection." IEEE Access 6 (2018): pp. 67594-67610. (Year: 2018).*

Bal, Mert. "Industrial applications of collaborative wireless sensor networks: A survey." 2014 IEEE 23rd international symposium on industrial electronics (ISIE). IEEE, 2014.pp. 1463-1468 (Year: 2014).*

Qiu, Tie, et al. "How can heterogeneous internet of things build our future: A survey." IEEE Communications Surveys & Tutorials 20.3 (2018): pp. 2011-2027. (Year: 2018).*

International Search Report and Written Opinion on PCT/US2020/055808, dated Jan. 27, 2021, 16 pages.

Khorsheed et al., "An integrated machine learning: Utility theory framework for real-time predictive maintenance in pumping systems," Journal of Engineering Manufacture, 2021, vol. 235(5) (pp. 887-901).

Tai et al., "Automatic Road Anomaly Detection Using Smart Mobile Device," Conference on Technologies and Applications of Artificial Intelligence, Hsinchu, Taiwan, 2010 (pp. 1-8).

Yan et al., "On Accurate and Reliable Anomaly Detection for Gas Turbine Combustors: A Deep Learning Approach," arXiv preprint arXiv:1908.09238, 2019 (8 pages).

Brotherton et al. "A Testbed for Data Fusion for Engine Diagnostics and Prognostics," Proceedings, IEEE Aerospace Conference, 2002, vol. 6 (pp. 6-3029 to 6-3042).

Mosallam et al., "Component based Data-driven Prognostics for Complex Systems: Methodology and Applications," 2015 First International Conference on Reliability Systems Engineering (ICRSE), Beijing, China, Oct. 21-23, 2015 (7 pages).

Reffat et al., "Using data mining on building maintenance during the building life cycle," 38th Australian & New Zealand Architectural Science Association (ANZASCA), Launceston, Tasmania, Nov. 10-12, 2004 (pp. 91-97).

Douat et al., "Identification and Vibration Attenuation for the Parallel Robot Par2," IEEE Transactions on Control Systems Technology, Jan. 2014, 22.1 (pp. 190-200).

Geng et al., "Six Degree-of-Freedom Active Vibration Control Using the Stewart Platforms," IEEE Transactions on Control Systems Technology, Mar. 1994, 2.1 (pp. 45-53).

Jong Hoon et al., "SPAMMS: A Sensor-Based Pipeline Autonomous Monitoring and Maintenance System," 2010 Second International Conference on COMmunication Systems and NETworks (COMSNETS 2010) Jan. 5-9, 2010 (10 pages).

* cited by examiner

FIG. 17

EDGE DEVICES AND GATEWAYS WITH MACHINE LEARNING FOR DETECTING ANOMALIES IN BUILDING EQUIPMENT VIBRATION DATA

CROSS-REFERENCE TO RELATED APPLICATIONS

This application is a continuation-in-part of U.S. patent application Ser. No. 16/658,822, filed Oct. 21, 2019, the entire disclosure of which is incorporated by reference herein.

BACKGROUND

The present disclosure relates generally to the field of building equipment for a building and more particularly to systems and methods for monitoring and controlling building equipment using machine learning.

To ensure building equipment for a building is operating correctly, monitoring of various aspects of operation of the building equipment can be performed. Technological solutions for monitoring and controlling building equipment can enable analyses and automated corrective actions under unstable, sporadic, or missing connections to human analysts and can provide operational intelligence based on high-frequency data (e.g., greater than 10,000 Hz) that cannot feasibly be processed by human users, among other technical advantages that address challenges with monitoring operation of building equipment.

SUMMARY

One implementation of the present disclosure is a system. The system includes a plurality of vibration sensors configured to be coupled to a unit of building equipment, an edge device arranged between the plurality of vibration sensors and a communications network. The edge device is programmed to detect an abnormality in vibration data from the plurality of vibration sensors by ingesting streams of vibration data from the plurality of vibration sensors, performing signal processing on the streams of vibration data to obtain inputs for a machine learning model, determining whether the abnormality is occurring by applying the inputs to the machine learning model, determining a trend associated with the abnormality based on outputs of the machine learning model, and causing a portion of the vibration data to be communicated to a first computing system via the communications network in response to the trend satisfying a criterion.

In some embodiments, the system includes a sensor controller electrically arranged between the plurality of vibration sensors and the edge device. The sensor controller is configured output the streams of vibration data to the edge device via an Ethernet connection and based on signals received at the sensor controller from the plurality of vibration sensors via two-wire connections. In some embodiments, the machine learning model used by the edge device is an edge version of the machine learning model adapted from a cloud version of the machine learning model.

In some embodiments, the system also includes a second computing system communicable with the edge device via the communications network, wherein the second computing system is programmed to modify settings of the edge device and/or of the plurality of vibration sensors in accordance with one or more selections made by a user via a dashboard hosted by the second computing system. In some embodiments, the one or more selections include a configuration parameter for a first sensor of the plurality of vibration sensors. The one or more selections may include a preprocessing logic to be applied to the streams of vibration data via a reactive, functional programming language. In some embodiments, determining whether the abnormality is occurring further includes outputting probabilities from the machine learning model and comparing the probabilities to one or more thresholds. In some embodiments, the inputs include fast Fourier transform spectra of the streams of vibration data.

In some embodiments, the trend indicates a change in a degree of the abnormality or a duration of the abnormality. Determining the trend may include post-processing the outputs of the machine learning model using complex event processing.

Another implementation of the present disclosure is an edge device. The edge device includes an input port configured to receive vibration data indicative of vibration of a unit of building equipment and circuitry programmed to detect an abnormality in the vibration data by ingesting one or more streams of the vibration data, performing signal processing on the one or more streams of vibration data to obtain inputs for a machine learning model, determining whether the abnormality is occurring by applying the inputs to the machine learning model, and, in response to a determination that the abnormality is occurring, determining a trend associated with the abnormality. The edge device also includes a communications interface configured to cause a subset of the vibration data to be communicated to a first computing system via a communications network in response to a determination that the trend satisfies a criterion and abstain from causing the subset of vibration data to be communicated to the first computing system in response to a determination that trend does not satisfy the criterion.

In some embodiments, the circuitry is further configured to cause the unit of building equipment to take a corrective action in response to detecting the abnormality. In some embodiments, the circuitry is reprogrammable in response to instructions received from a second computing system via the communications interface and the instructions cause an adjustment of a parameter associated with a sensor providing the vibration data or a reactive, functional programming language used by the circuitry in detecting the abnormality.

In some embodiments, determining whether the abnormality is occurring further includes outputting probabilities from the machine learning model and comparing the probabilities to one or more thresholds and the trend is based on changes in the probabilities. In some embodiments, the inputs include fast Fourier transform spectra of the streams of vibration data.

Another implementation of the present disclosure is a method. The method includes measuring, by one or more sensors, vibration of a unit of building equipment, ingesting, by an edge device, one or more streams of vibration data from the one or more sensors, performing, by the edge device, signal processing on the one or more streams of vibration data to obtain inputs for a machine learning model, determining, by the edge device, a trend of the abnormality is occurring by applying the inputs to the machine learning model and post-processing an output of the machine learning model, abstaining, by the edge device, from communicating the vibration data over a communications network unless the trend satisfies a criterion.

In some embodiments, the method also includes customizing logic used in the steps of ingesting, performing, and/or determining by modifying programming of the edge device based on instructions received from a computing system over the communications network. In some embodiments, the method also includes automatically adjusting an operation of the unit of building equipment in response to determining that the trend satisfies the criterion. In some embodiments, the one or more streams of vibration data have a frequency greater than fifteen thousand Hertz.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE FIGURES

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 17 is a second view of a manager interface for the system of FIG. 12, according to some embodiments.

DETAILED DESCRIPTION

Overview

Figure 1:
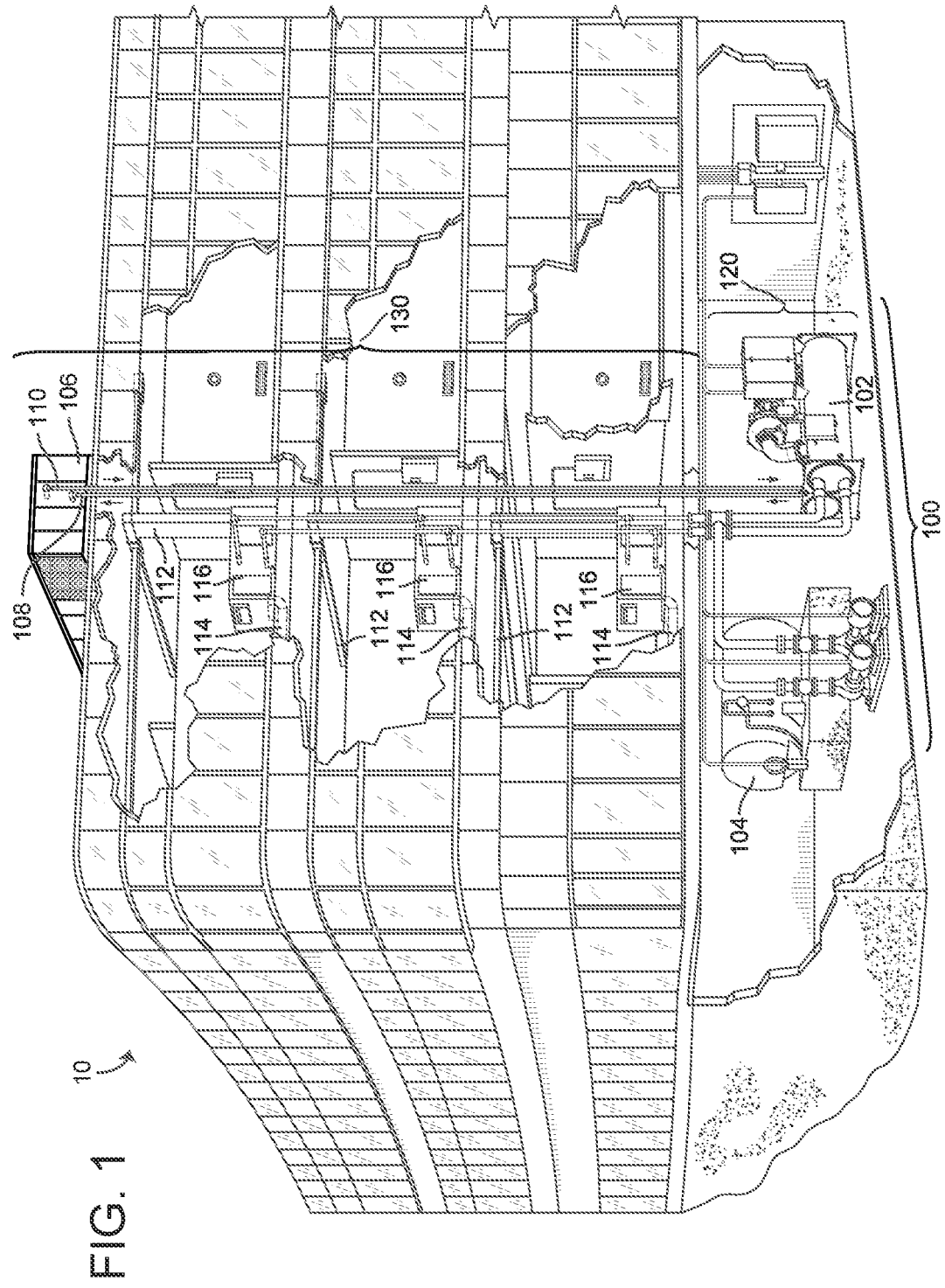
FIG. 1 is a drawing of a building equipped with a HVAC system, according to some embodiments.

Referring generally to the FIGURES, systems and methods for identifying abnormalities in vibration data sets for building equipment is shown, according to some embodiments. The systems and methods discussed herein can collect data from building equipment and analyze the collected data to determine whether the building equipment may be in a fault state. In particular, the systems and methods described herein can incorporate machine learning (ML) models that can automatically analyze and identify possible abnormalities in the vibration data sets.

The ML model can be used to classify vibration data sets as either "normal" or "abnormal." Normal data sets may indicate associated building equipment is operating as expected and that no faults may be present. However, if the ML model classifies a data set as abnormal, the ML model may have determined that the building equipment has a possibility of being in a fault status. As such, any vibration data sets tagged by the ML model as abnormal can be provided to an analyst for further review. This can ensure that a professional opinion of an individual trained in analyzing vibration data sets can provide feedback regarding whether building equipment associated with abnormal data sets is actually in a fault state. Using the systems and methods described herein, a workload on analysts can be reduced as some data sets can be automatically flagged as normal. In other words, analysts may not be required to analyze every vibration data set generated by building equipment.

In some embodiments, ingestion and analysis of vibration data is performed at the edge, i.e., performed physically proximate the associated building equipment by a device receiving vibration data from one or more sensors without the vibration data first being transmitted over a communications network (e.g., Internet). Features described herein can enable such processing to be performed on edge devices (e.g., an edge gateway) with limited memory resources and processing power (e.g., less than 1 GB memory, less than 2 GB memory, etc.).

Advantageously, performing vibration analyses as described herein at the edge drastically reduces communications bandwidth relative to other approaches where vibration data sets are transmitted to a remote server (e.g., cloud resource) because raw data need not be continuously or repeatedly uploaded to the remote server. At sample rates that may be used herein of greater than 10,000 Hz (e.g., 25,000 Hz, 50,000 HZ, 100,000 Hz) for each of multiple sensors, streaming data to a remote server could require communication bandwidth on the order of megabytes per second, whereas performing analysis of such data at the edge can reduce communication requirements to sporadic uploads having sizes on the order of hundreds of kilobytes per detected anomaly. Network demands are thereby reduced, directly providing efficiencies and creating additional advantages such as enabling vibration analysis to be unaffected by unstable or sporadic network connections from the edge to a remote server and eliminating complications that may otherwise because by unpredictable network latencies. In some scenarios, higher-frequency data samples (e.g., 25,000 Hz, 50,000 Hz, etc.) and/or more sensors (e.g., two, three, four, or more sensors) can be used as compared to other approaches in which transmissions of such large amounts of data would be prohibitive. Multiple direct and indirect technical advantages are thereby provided by the teachings herein.

These and other features of the systems and methods are described in greater detail below.

Building HVAC Systems and Building Management Systems

Figure 2:
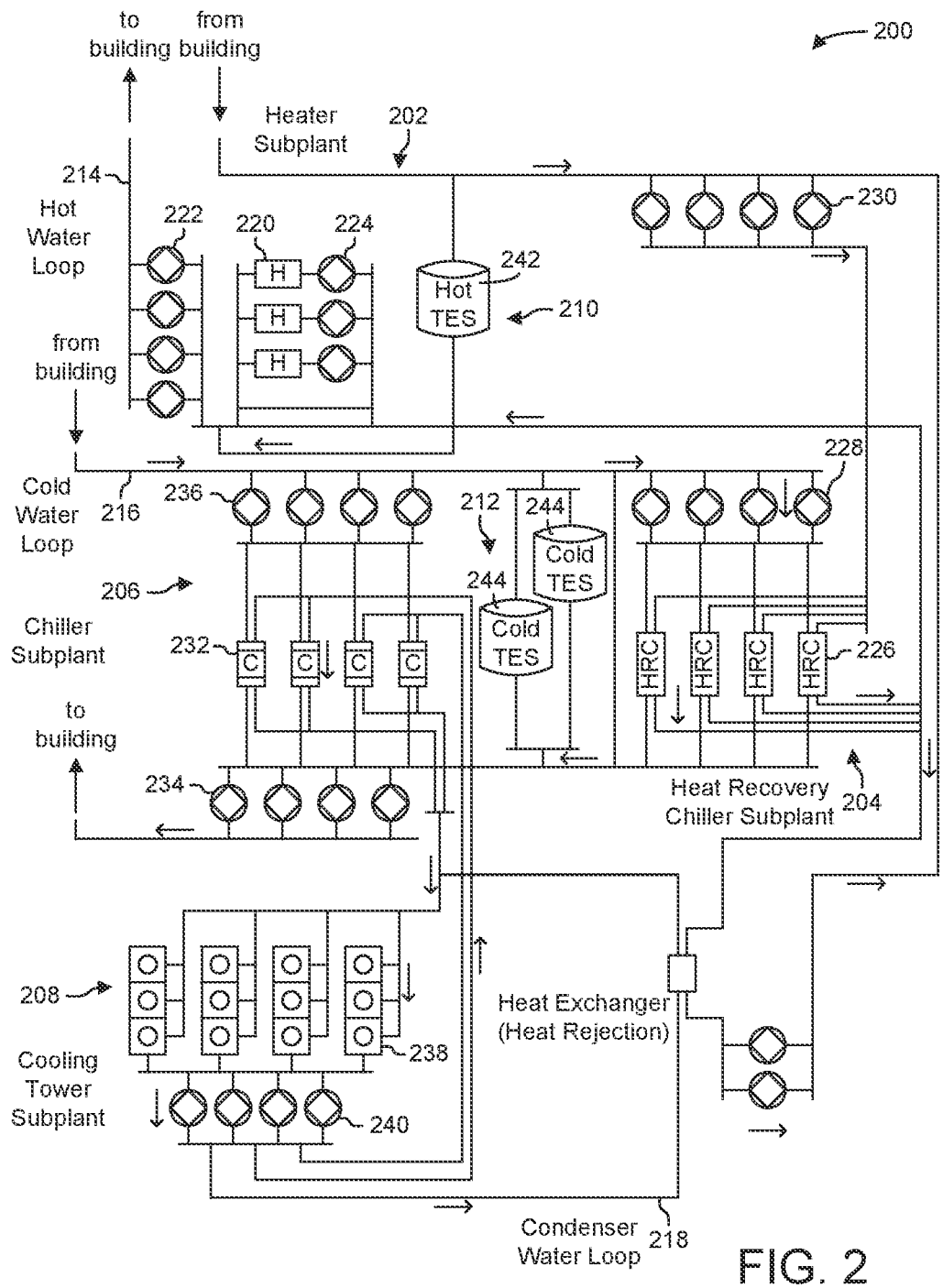
FIG. 2 is a block diagram of a waterside system which can be used to serve the heating or cooling loads of the building of FIG. 1, according to some embodiments.
Figure 3:
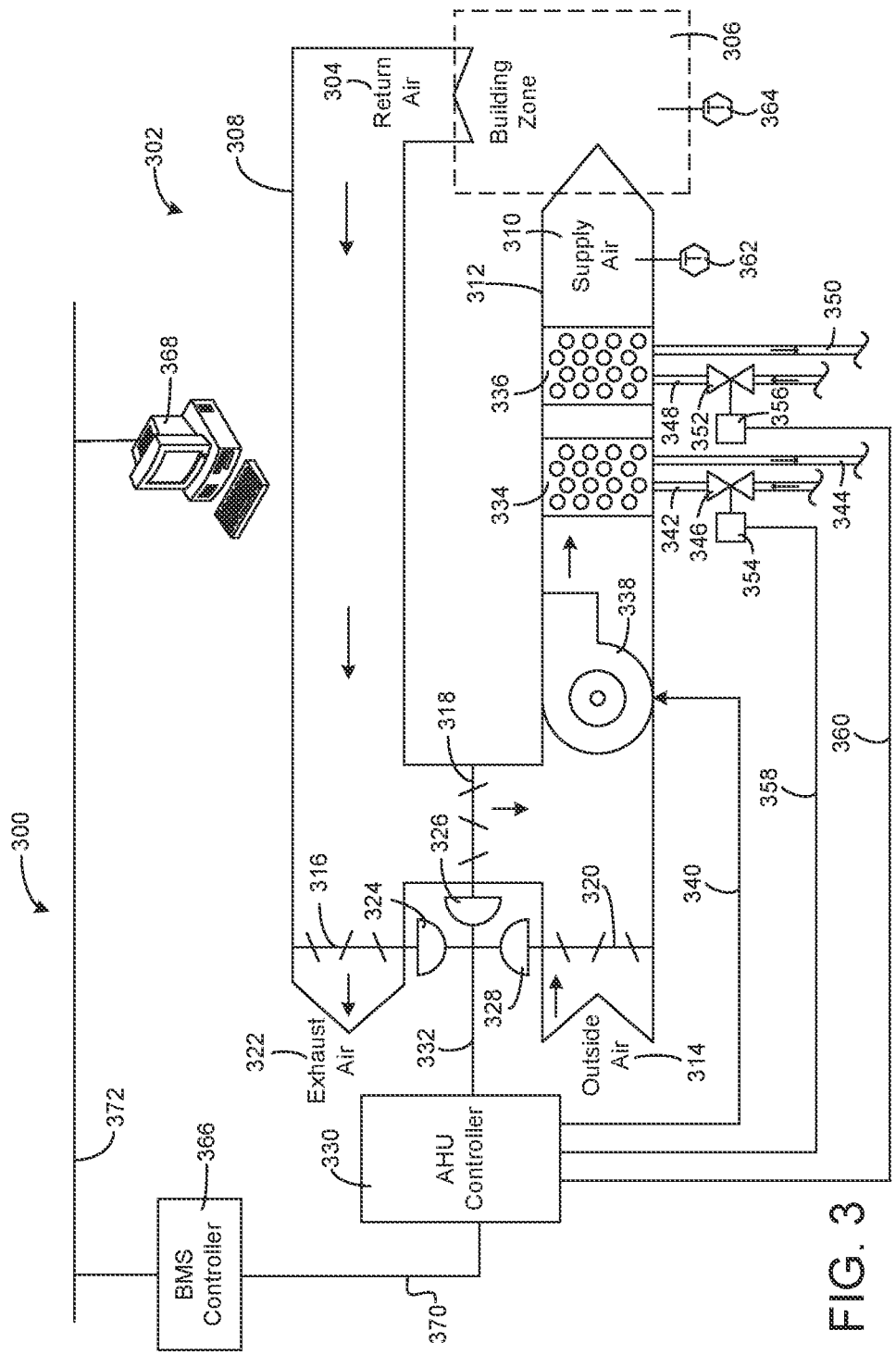
FIG. 3 is a block diagram of an airside system which can be used to serve the heating or cooling loads of the building of FIG. 1, according to some embodiments.
Figure 4:
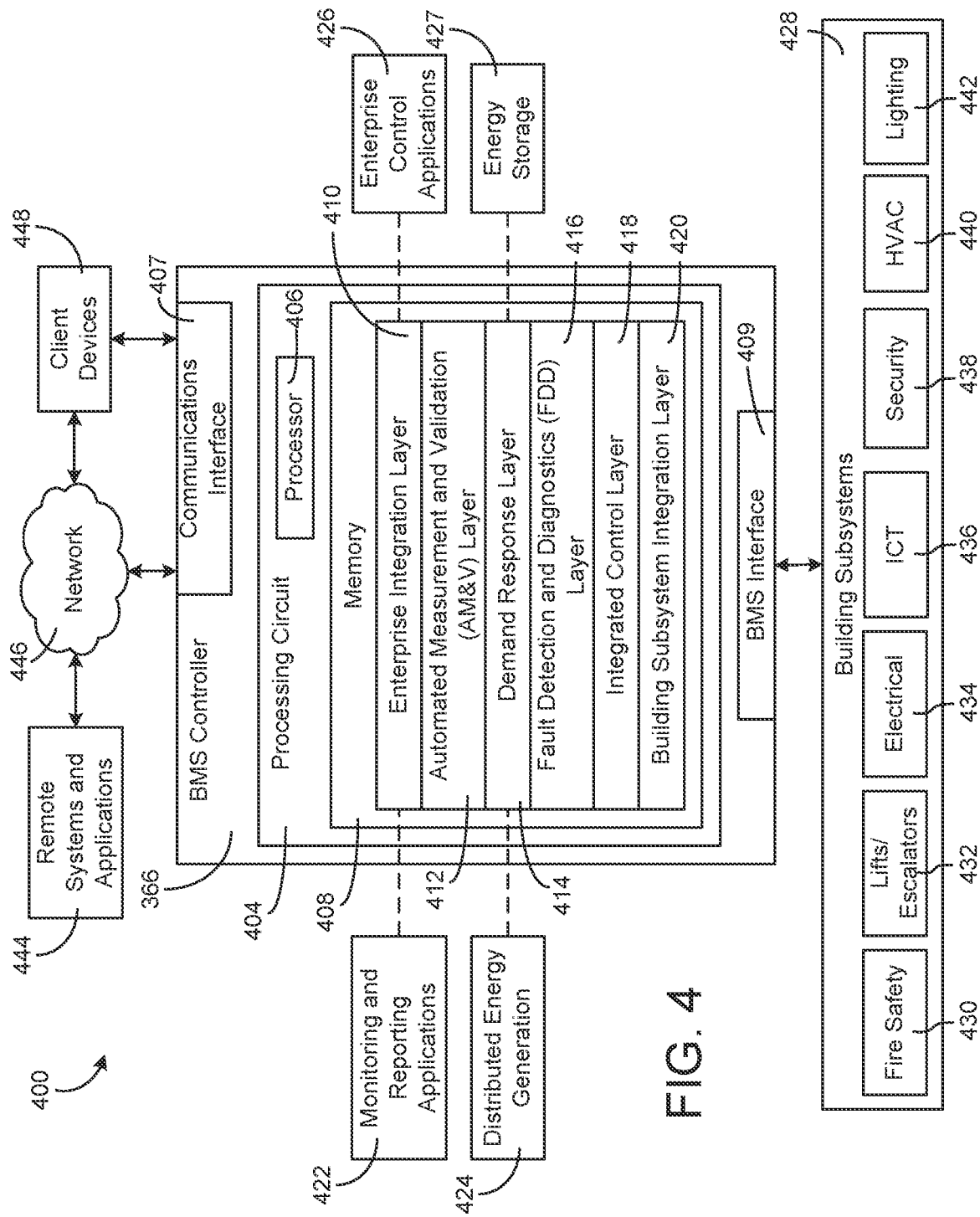
FIG. 4 is a block diagram of a building management system (BMS) which can be used to monitor and control the building of FIG. 1, according to some embodiments.
Figure 5:
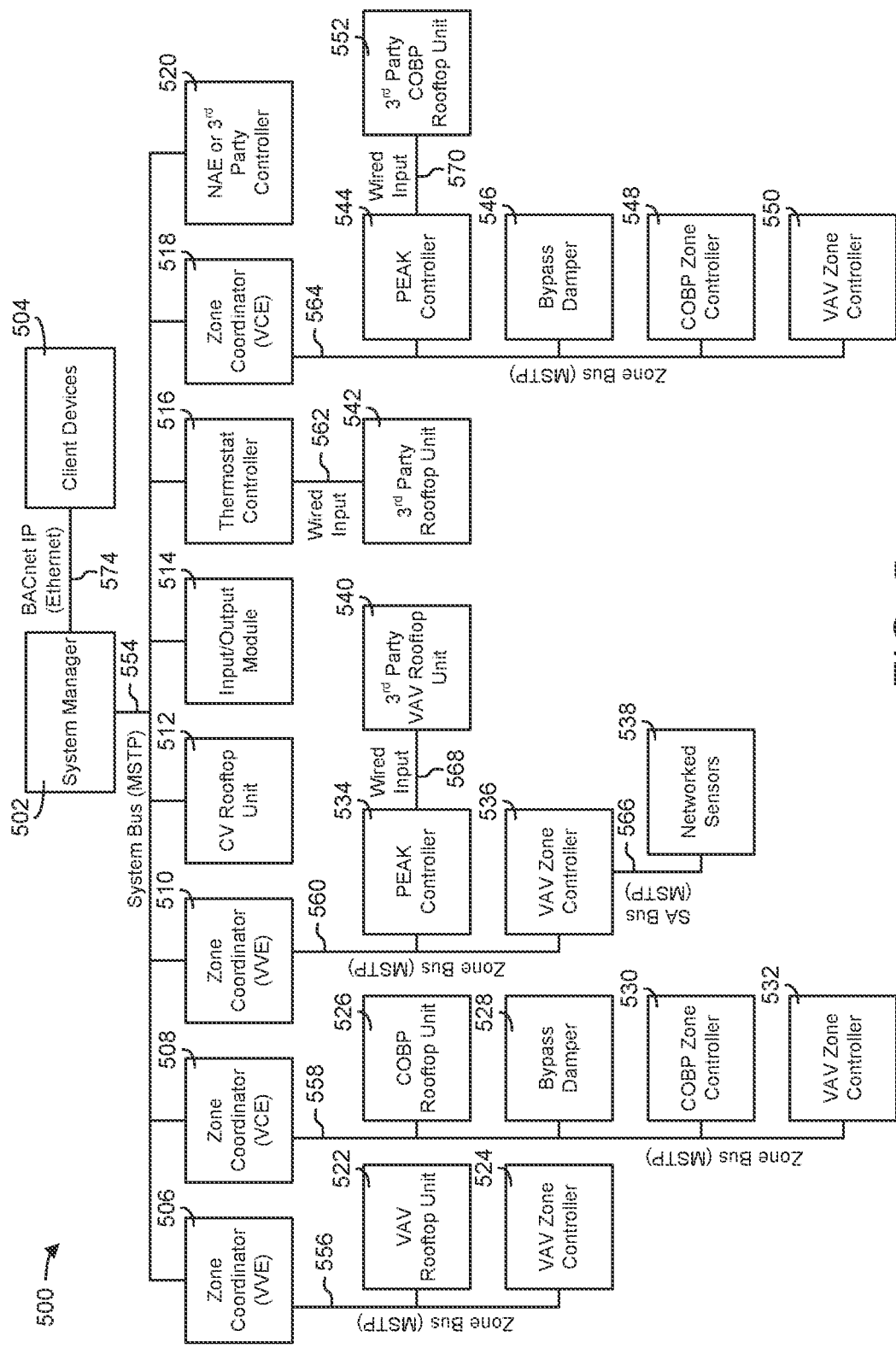
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Chiller Assembly

Figure 6:
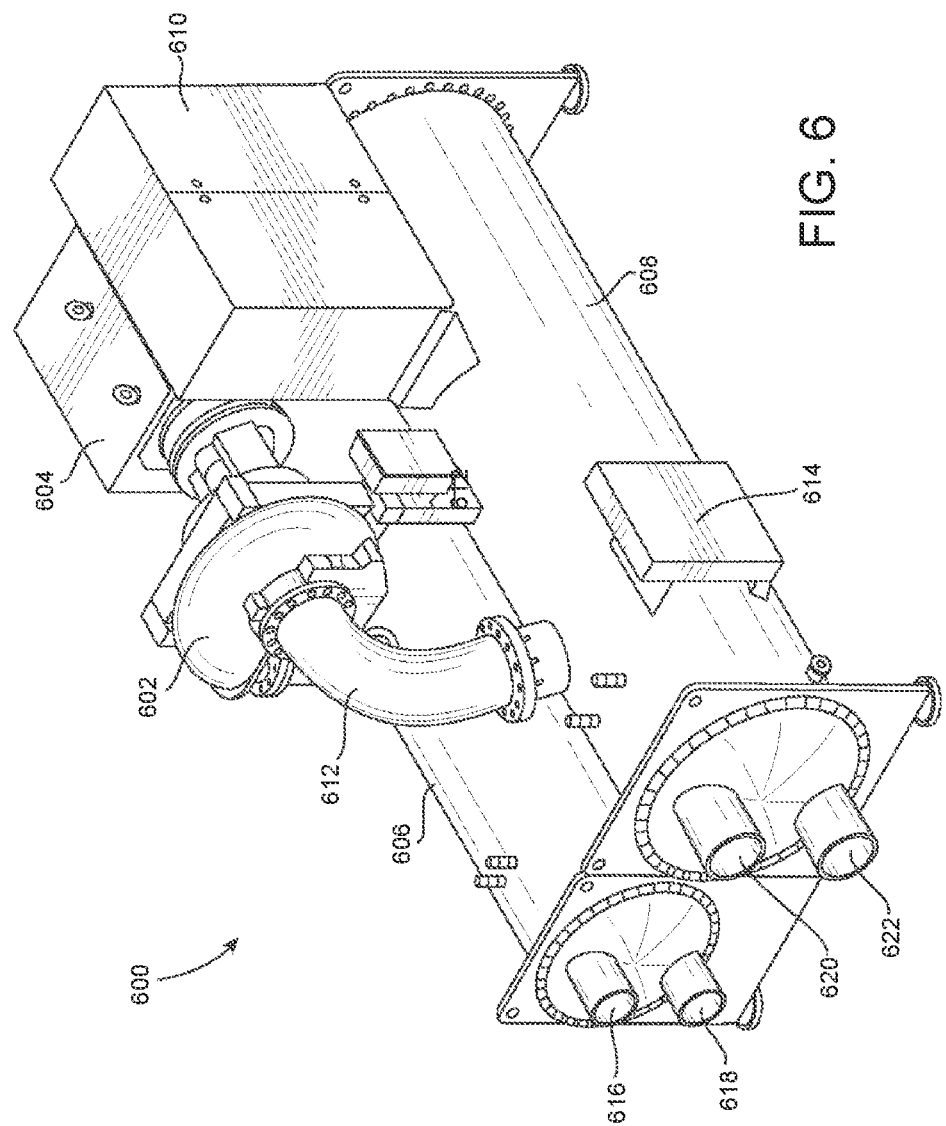
FIG. 6 is a drawing of a chiller assembly associated with the HVAC system of FIG. 1, according to some embodiments.

Turning now to FIG. 6, an example implementation of a chiller assembly 600 is shown, according to some embodiments. Chiller assembly 600 may be identical or nearly identical to chiller 102 described above. Chiller assembly 600 is shown to include a compressor 602 driven by a motor 604, a condenser 606, and an evaporator 608. A refrigerant can be circulated through chiller assembly 600 in a vapor compression cycle or an absorption refrigeration cycle. The refrigerant can be a low pressure refrigerant with an operating pressure less than 400 kPa, for example. Chiller assembly 600 can also include a control panel 614 configured to control operation of the vapor compression cycle within chiller assembly 600. Control panel 614 may be connected to a variety of sensors (e.g., pressure sensors, temperature sensors) and an electronic network (e.g., network 446) in order to communicate a variety of data related to maintenance, analytics, performance, etc. The sensors may additionally or alternatively communicate directly with a controller (e.g., BMS controller 366) and/or BMS 400.

Motor 604 can be powered by a variable speed drive (VSD) 610. In some embodiments, VSD 610 receives alternating current (AC) power having a fixed line voltage and fixed line frequency from an AC power source (not shown) and provides power having a variable voltage and frequency to motor 604. Motor 604 can be any type of electric motor that can be powered by VSD 610

For example, motor 604 can be a high speed induction motor. Compressor 602 can be driven by motor 604 to compress a refrigerant vapor received from evaporator 608 through a suction line 612. For example, compressor 602 can include an impeller comprising a plurality of blades configured to rotate at a high speed in order to compress refrigerant vapor. Compressor 602 may then delivers compressed refrigerant vapor to condenser 606 through a discharge line. Compressor 602 can be a centrifugal compressor, a screw compressor, a scroll compressor, a turbine compressor, or any other type of suitable compressor.

Evaporator 608 can include an internal tube bundle (not shown), a supply line 620, and a return line 622 for supplying and removing a process fluid to the internal tube bundle. Supply line 620 and return line 622 can be in fluid communication with a component within an HVAC system (e.g., air handler 106) via conduits that circulate the process fluid. In some embodiments, the process fluid is a chilled liquid for cooling a building and can be, but is not limited to, water, ethylene glycol, calcium chloride brine, sodium chloride brine, or any other suitable liquid. Evaporator 608 can be configured to lower the temperature of the process fluid as the process fluid passes through the tube bundle of evaporator 608 and exchanges heat with the refrigerant. Refrigerant vapor is formed in evaporator 608 by the refrigerant liquid delivered to the evaporator 608 exchanging heat with the process fluid and undergoing a phase change to refrigerant vapor.

Refrigerant vapor delivered by compressor 602 to condenser 606 transfers heat to a fluid. Refrigerant vapor condenses to refrigerant liquid in condenser 606 as a result of heat transfer with the fluid. The refrigerant liquid from condenser 606 can flow through an expansion device and be returned to evaporator 608 to complete the refrigerant cycle of the chiller assembly 600. Condenser 606 includes a supply line 616 and a return line 618 for circulating fluid between the condenser 606 and an external component of the HVAC system (e.g., a cooling tower). Fluid supplied to condenser 606 via return line 618 can exchange heat with the refrigerant in condenser 606 and can be removed from the condenser 606 via supply line 616 to complete the cycle. The fluid circulating through the condenser 606 can be water or any other suitable liquid.

In some embodiments, chiller assembly 600 illustrates an example building device that can be monitored for vibrational data. Sensors can be mounted to an external casing of chiller assembly 600. Specifically, sensors may be mounted at bearing locations across a drive line of chiller assembly 600. In this case, the bearing locations may be locations of chiller assembly 600 that experience transfer of forces to the external casing of chiller assembly 600. Sensors can be mounted to measure three-dimensional vibrational data of chiller assembly 600. In other words, the sensors can measure how chiller assembly 600 and/or associated components vibrate in three-dimensional space. Purely for sake of example, sensors for measuring vibrational data may be mounted at locations of chiller assembly 600 such as motor 604, VSD 610, compressor 602, suction line 612, etc. In this way, vibrational data can be collected across various locations of chiller assembly 600. Vibrational data and processing associated therewith is described in greater detail below with reference to FIGS. 7-11.

Building Management Systems

Referring generally to FIGS. 7-11, systems and methods for analyzing data sets and identifying faulty building equipment using machine learning are shown, according to some embodiments. Specifically, FIGS. 7-11 may relate to analyzing vibration data sets for building equipment that can provide an overall indication of whether specific building devices are functioning properly. However, it should be appreciated that similar methodologies described herein can be applied to data sets other than vibration data sets. As such, vibration data sets are provided for purposes of example and are not intended to be limiting on the present disclosure. Other types of data sets are contemplated in the present disclosure as well. Further, it should be appreciated that analyzing vibration data sets for building equipment as described herein is provided for sake of example. Analyzation of vibration data sets as described herein can be applied to any sort of equipment and is not intended to be limited to building equipment. For example, vibration data sets can be gathered and analyzed for equipment such as photolithography equipment, microelectronics manufacturing equipment or other manufacturing equipment, etc. In this way, vibration data sets can be analyzed to detect faults and/or other problems in various types of equipment.

Vibration analysis is an important tool in identifying mechanical issues in building equipment such as chillers, fans, pumps, etc. In some embodiments vibrational data is collected on-site by mounting sensors on building equipment. For example, sensors may be placed on a casing of a machine at bearing locations across a machine drive line. Vibrational sensors may be placed at bearings as bearings may be a primary point where forces are transferred from internal components to an external casing. Sensors may be placed across multiple bearing points (e.g., 3 points, 4 points, 10 points, etc.) on a building device and can monitor/ gather vibrational data across 3-dimensional spatial coordinates (i.e., X axis, Y axis, and Z axis). The vibrational data can be assessed to identify potential issues so they can be corrected before serious damage to the building equipment occurs. While rules derived from years of domain knowledge may automate a portion of the analysis, said rules are incomplete and cannot confidently rule out a possibility of building faults, and therefore human inspection of all datasets may be required in traditional systems.

Due to modern advances in building equipment, most building equipment is highly reliable and experiences faults relatively infrequently. As such, a large amount of vibration data sets associated with building equipment may indicate the building equipment is operating as normal. Requiring analysts to manually parse through data sets that have no suspicion of indicating faults can be time-consuming and wasteful for the analysts and a company hiring said analysts. As such, a machine learning model can be utilized to qualify data sets into categories indicating whether the data sets appear to indicate normal operation or appear to indicate an issue with building equipment that should be addressed in further detail.

As a size of collected vibration data sets increases, human analysis of each data set may become more and more unviable. As such, a machine learning (ML) model can be utilized to reduce an amount of data sets required for human analysis. By automating at least part of the analysis process, a burden on analysts can be reduced and money can be saved for a company (e.g., by requiring fewer analysts) among other benefits.

When analyzing data sets for building equipment, it may be important for the ML model to generate reports (i.e., results of automated analyses) that do not let any data set be flagged as "normal" (i.e., no issue is present) when the data set is actually "abnormal" (i.e., a problem with the building equipment is present). In other words, anomaly detection performed by the ML model may be configured such that any data sets that have even a slight change of being abnormal may be flagged for further analysis by an analyst. In this way, a number of false negatives can be reduced/ eliminated to ensure that no critical faults are missed by the ML model and are accidentally flagged as normal.

Figure 7:
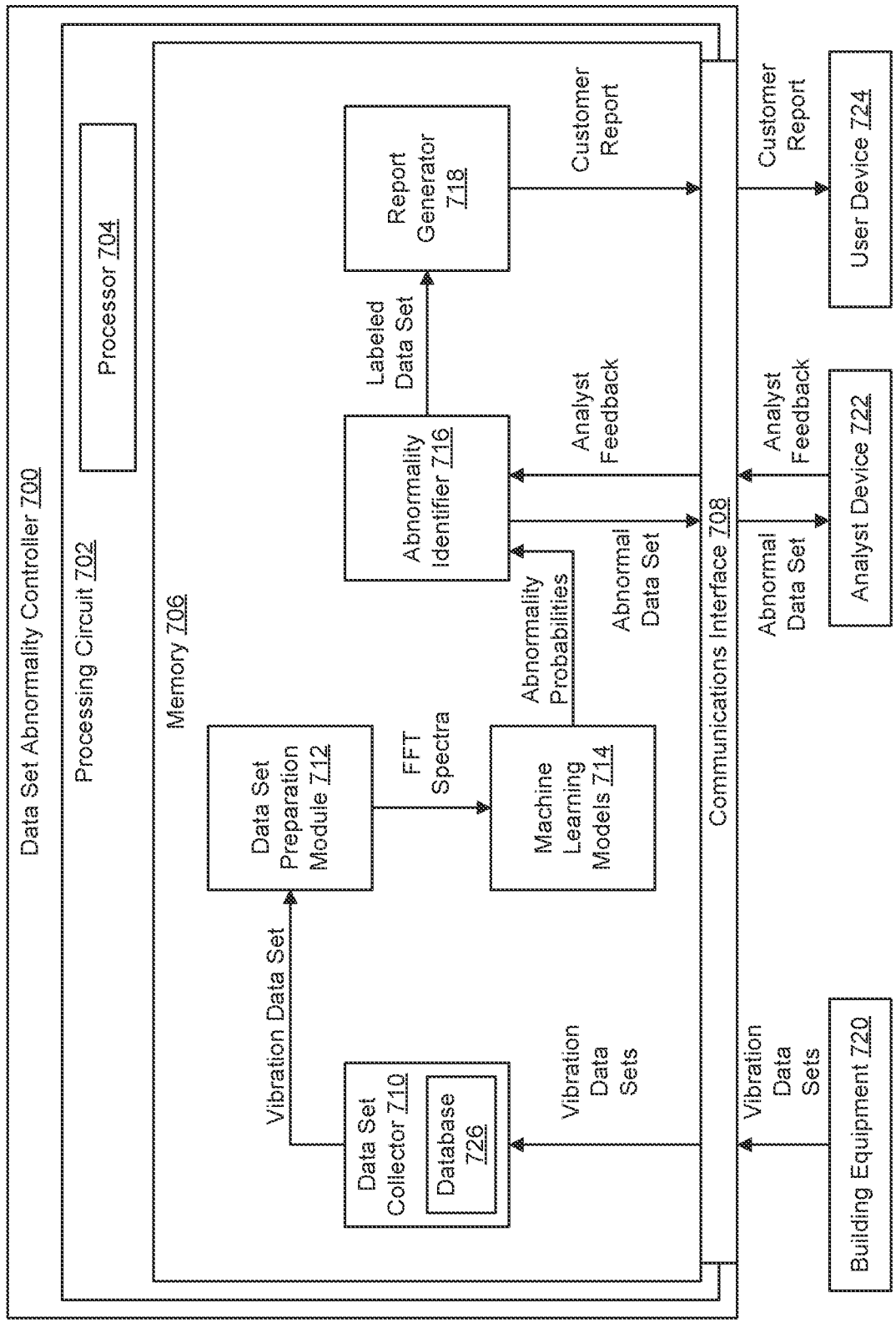
FIG. 7 is a block diagram of data set abnormality controller, according to some embodiments.

Referring now to FIG. 7, a block diagram of data set abnormality controller 700 is shown, according to some embodiments. Data set abnormality controller 700 can be configured to analyze vibration data sets (or other types of data sets) to determine if the data sets include abnormalities that may be indicative of problems with building equipment (e.g., building equipment 720). In particular, data set abnormality controller 700 can utilize ML models to qualify data sets as either normal or abnormal such that abnormal data sets can be further analyzed by an analyst.

As described in greater detail below, data set abnormality controller 700 can provide various benefits for a building system and employees associated therewith. In particular, by implementing the ML models for qualifying data sets, an efficiency of analysts that analyze vibrational data can be increased and a number of data sets the analysts are required to evaluate can decrease.

Data set abnormality controller 700 is shown to include a communications interface 708 and a processing circuit 702. Communications interface 708 may include wired or wireless interfaces (e.g., jacks, antennas, transmitters, receivers, transceivers, wire terminals, etc.) for conducting data communications with various systems, devices, or networks. For example, communications interface 708 may include an Ethernet card and port for sending and receiving data via an Ethernet-based communications network and/or a Wi-Fi transceiver for communicating via a wireless communications network. Communications interface 708 may be configured to communicate via local area networks or wide area networks (e.g., the Internet, a building WAN, etc.) and may use a variety of communications protocols (e.g., BACnet, IP, LON, etc.).

Communications interface 708 may be a network interface configured to facilitate electronic data communications between data set abnormality controller 700 and various external systems or devices (e.g., building equipment 720, analyst device 722, user device 724, etc.). For example, data set abnormality controller 700 may receive vibration data sets from building equipment 720 via communications interface 708.

Processing circuit 702 is shown to include a processor 704 and memory 706. Processor 704 may be a general purpose or specific purpose processor, an application specific integrated circuit (ASIC), one or more field programmable gate arrays (FPGAs), a group of processing components, or other suitable processing components. Processor 704 may be configured to execute computer code or instructions stored in memory 706 or received from other computer readable media (e.g., CDROM, network storage, a remote server, etc.).

Memory 706 may include one or more devices (e.g., memory units, memory devices, storage devices, etc.) for storing data and/or computer code for completing and/or facilitating the various processes described in the present disclosure. Memory 706 may include random access memory (RAM), read-only memory (ROM), hard drive storage, temporary storage, non-volatile memory, flash memory, optical memory, or any other suitable memory for storing software objects and/or computer instructions. Memory 706 may include database components, object code components, script components, or any other type of information structure for supporting the various activities and information structures described in the present disclosure. Memory 706 may be communicably connected to processor 704 via processing circuit 702 and may include computer code for executing (e.g., by processor 704) one or more processes described herein. In some embodiments, one or more components of memory 706 are part of a singular component. However, each component of memory 706 is shown independently for ease of explanation.

Memory 706 is shown to include a data set collector 710. Data set collector 710 can be configured to receive vibration data sets from building equipment 720 (e.g., via communications interface 708). Building equipment 720 can include any equipment that operates to affect a variable state or condition of a building and/or other space. Specifically, building equipment 720 can operate to affect environmental conditions of the building and/or other space. As such, building equipment 720 may include, for example, chillers, boilers, air handling units, fire suppression equipment, etc. In some embodiments, building equipment 720 includes some and/or all of the subsystems of building subsystems 428 as described with reference to FIG. 4.

In some embodiments, vibration data sets are generated by sensors affixed to devices of building equipment 720 and/or otherwise capable of obtaining vibrational measurements of building equipment 720. A typical vibration data set may include timewave data indicating acceleration over time. In some embodiments, the timewave data is collected by accelerometers on different physical points on a building device. For example, a data set for a chiller may include vibration signals collected from locations of the chiller such as a compressor, an off-end motor, and a drive-end motor. In this example, vibration data can be collected in three sensor orientations (e.g., X, Y, and Z directions of three-dimensional space), thereby generating 9 timewaves in total. Each of the timewaves can be evaluated by a ML model (or multiple ML models) for accurate anomaly detection. This can ensure that if equipment faults are only detectable at certain locations and/or orientations of the device, the faults can nonetheless be detected. In some embodiments, the vibration data sets also includes information such as machine metadata, machine operating conditions, one or more time waveforms, relevant machine specifications (e.g., a line frequency, a number of impeller blades, a gear ratio), etc. Additional information other than raw vibration signals can help the ML model in determining frequencies and ranges where vibration signals may be expected. Vibration data sets are described in greater detail in U.S. patent application Ser. No. 15/993,331 filed May 30, 2018, the entirety of which is incorporated by reference herein. Vibration data sets are also described in greater detail in U.S. patent application Ser. No. 16/413,892 filed May 16, 2019, the entirety of which is incorporated by reference herein. In some embodiments, the systems and methods described herein can be implemented with the systems and methods described in the incorporated patent applications.

In some embodiments, data set collector 710 stores collected vibration data sets in a database 726. Database 726 is shown as a component of data set collector 710 for ease of explanation. Database 726 may be a separate component of data set abnormality controller 700 and/or may be separate from data set abnormality controller 700 altogether. For example, database 726 may be hosted by a cloud provider and hosted on a cloud computation system that data set abnormality controller 700 can communicate with. In this case, data set collector 710 may transmit and receive vibration data sets to and from the cloud computation system via communications interface 708. In any case, by storing vibration data sets in database 726, the vibration data sets can be saved and later used for other processes such as retraining an ML model for detecting abnormalities, displaying vibration data sets to analysts, etc.

Data set collector 710 can provide vibration data sets to data set preparation module 712. Data set preparation module 712 can prepare vibration data sets for being used as input to ML models 714. Dependent on a format of ML models 714, some ML models of ML models 714 may require vibrational data to be presented as input in a format other than raw vibration signals. As such, data set preparation module 712 can manipulate vibration data sets received from data set collector 710 to ensure data provided to ML models 714 is in a proper format and includes useful information.

In some embodiments, data set preparation module 712 performs fast Fourier transforms (FFTs) for each timewave associated with a vibration data set. The FFTs can represent the timewaves in a frequency domain such that the vibration data sets can be more easily processed by ML models 714. In some embodiments, each FFT for a timewave is calculated with a certain frequency range and resolution. In this way, specific equipment abnormalities can be identified and resolved. For example, motor shaft issues may only be detectable at lower frequencies and gear set faults may only be detectable at high frequencies. As such, data set preparation module 712 can compute an FFT that captures low frequency ranges to detect motor shaft issues and can compute an FFT that captures high frequency ranges at which the gear set faults are detectable.

As a result of performing the FFTs, FFT spectra can be generated by data set preparation module 712 for a vibration data set. An FFT spectrum may include compiled results of individual FFTs performed on the vibration data set. Each FFT spectrum may be specific to a particular range of frequencies and resolution. The particular range of frequencies and resolution for a particular FFT spectra can define a "type" of the FFT spectra. The FFT spectra can be provided to machine learning models 714 as inputs.

It should be noted that FFTs are given as an example of data preparation that can be performed to prepare vibration data sets to be inputted to ML models 714. Computing FFTs for individual timewaves and using FFT spectra as input to ML models 714 can be useful if a large amount of historical data is unavailable. In some embodiments, other approaches for data preparation are utilized. For example, ML models 714, as described in detail below, may utilize time domain data as input. In this case, data set preparation module 712 can manipulate vibration data sets to be in a proper time domain format for input to ML models 714. As another example, data set preparation module 712 may perform discrete cosine transforms on the vibration data sets such that the vibration data sets can be analyzed by ML models 714. In general, data set preparation module 712 can perform processing on vibration data sets received from data set collector 710 to ensure input to ML models 714 is in a proper format. In some embodiments, if ML models 714 use raw vibration signals as input, data set preparation module 712 may or may not be a component of memory 706. In some embodiments, ML models 714 directly utilize timewave data as inputs to analyze vibration data sets which may or may not require data preparation by data set preparation module 712.

ML models 714 can include one or more ML models that can determine probabilities that a vibration data set includes at least one abnormality based on FFT spectra. For example, an ML model of ML model 714 may predict that a first vibration data set has a 30% probability of including an abnormality whereas a second vibration data set has a 70% probability of including an abnormality. In some embodiments, ML models 714 output a different indicator of abnormalities in vibration data sets. For example, an ML model of ML models 714 may output a binary decision (e.g., yes or no) indicating whether or not the ML model predicts that a vibration data set includes an abnormality.

ML models 714 can provide additional information for analysts to consider if evaluating machine health of building equipment 720. Insight provided by ML models 714 may include predicted health scores for specific machine components, a determination of important machine speeds, highlighting of regions of vibration spectra that need attention, etc. In this way, analyst efficiency in analyzing vibration data sets can increase by providing additional information beyond raw vibration data.

ML models 714 can also assess a condition of an entire device and indicate whether the device is functioning normally, or if the device is potentially abnormal and should be evaluated by a human analyst. In this way, ML models 714 can eliminate some vibration data sets from needing to be analyzed by an analyst, thereby increasing efficiency of the analyst. In some embodiments, if enough data is available, ML models 714 can be trained to automatically and accurately diagnose fault building equipment. However, if accuracy of all decisions is of high priority (e.g., to a user), some and/or all vibration data sets identified as being potentially abnormal may be evaluated by human analysts to ensure that diagnoses of equipment problems are accurate.

ML models 714 can may include a variety of ML models generated for various building devices of building equipment 720. For example, ML models 714 may include ML models for identifying/predicting abnormalities in vibration data sets for chillers, pumps, fans, etc. Generating models for different building equipment may be important if multiple devices are analyzed as certain devices may be associated with more vibrations as opposed to others. In other words, a normal amount of vibration for one building device may not be the same for a separate building device (e.g., a normal amount of vibration for a chiller may not be the same as for a boiler). As such, each building device and/or building device type can have a separate ML model for analyzing vibration data. In any case, an ML model of ML models 714 can evaluate vibration data collected from a building device and determine whether any of the vibration spectra (i.e., the FFT spectra) for the building device are abnormal. Results from vibration spectra can be aggregated to determine whether the entire dataset may be abnormal. In this way, output of ML models 714 can be used to filter out vibration datasets that are "normal" and do not need to be evaluated by a human analyst. In some embodiments, ML models 714 further detect specific types of faults or machine malfunctions, as opposed to generic abnormalities.

In some embodiments, the ML models of ML models 714 are convolutional neural networks (CNNs). CNNs can be useful particularly problems where local relationships within input data are important (e.g., image classification tasks). In other words, CNNs can be useful in cases where repeating patterns exist throughout a sample input. While analysis of vibration spectra may be complex, signatures of abnormal equipment function can often be detected visually in the frequency domain. As such, CNN models can be utilized to identify abnormal vibration signals can reliably automate a portion of vibration analysis. As described above, reduction in a number of data sets manually analyzed by analysts can allow the analysts to focus on suspected abnormal equipment and thus accommodate a larger volume of data. In terms of ML models 714, the CNNs may be used to classify one-dimensional inputs.

CNNs can include convolutional layers, activation layers, pooling layers, and fully connected layers. A convolutional layer can include a number of filters that can learn different features from an input. With specific regard to ML models 714, the filters may learn to recognize, for example, FFT peaks and peak patterns, regardless of whether they appear in input. Convolutional layers may result in parameter sharing as peaks and spectral patterns may repeat throughout an FFT spectrum sample.

Activation layers of CNNs can apply an activation function to their inputs. With regards to CNNs of ML models 714, the CNNs can utilize rectified linear unit (ReLU) activation layers why can apply the following activation function:

$$f(x)=\max(0,x)$$

where x is some input value.

Pooling layers of CNNs can downsample their input to decrease a complexity of the CNN model. Specifically, downsampling can reduce a number of parameters of the CNN model. For example, pooling layers may take maximum values across small regions of the input to reduce a number of variables across each small region to one (i.e., the maximum value).

Fully connected layers of CNNs can operate as ordinary neural networks and can be used at the end of a CNN to output a final class score. In this way, the fully connected layers can output abnormality probabilities based on the FFT spectra received from data set preparation module 712.

Each spectrum one-dimensional CNN models of ML models 714 can evaluate one type of FFT of the FFT spectra provided by data set preparation module 712. Machine specs and spectrum-specific info (e.g., location and orientation of a sensor that made the vibration measurement) can be incorporated in the final layers of each model. Spectrum CNN models can be trained on labeled historical data that is available (e.g., stored in database 726) so that the spectrum CNN models output a probability that a given spectrum is abnormal (i.e., is indicative of a machine fault). In some embodiments, the spectrum CNN models further predict a specific type of machine fault that is present based on the FFT spectra. For example, the spectrum CNN models may learn to associate certain FFT spectra patterns with specific component failures. An example of CNN models that can be used to predict probabilities based on FFT spectra is described below with reference to FIG. 10.

To achieve good performance of abnormality predictions, CNN models of ML models 714 may require a large amount of training data. However, obtaining a large number of labeled vibration datasets may not feasible for all equipment types, and so, data availability may be a limiting factor for extending the anomaly detection models. To mitigate data availability problems, the CNN models may be trained using transfer learning. With transfer learning, an ML model can be trained on one set of data and then applied to a separate set of data for which there may be significantly less data. The ML model can be fine-tuned on the new set of data, but the performance is helped significantly by what the ML model learns from the first set of data. Transfer learning may work especially well if fundamental features the CNN learns (e.g., FFT peaks) are the same for the two data sets.

As an example of transfer learning that can be used in training the CNNs, a spectrum CNN model for a first chiller type may be trained based at least partially on vibration data sets for a second chiller type. In this case, the spectrum CNN model can be trained based on the vibration data sets and/or CNN models for the second chiller type and fine-tuned based on vibration data sets for the first chiller type. Specifically, the spectrum CNN model can be initially trained based on the vibration data sets for the second chiller type. Some of the learned weights of the spectrum CNN model can be fixed prior to fine-tuning based on vibration data sets for the first chiller type. In this case, a number of layers of the spectrum CNN model that are fixed can be configurable by testing what layers being fixed results in the best performance. In this way, the spectrum CNN model can be trained to predict abnormalities in vibration data sets for the first chiller type using data for the second chiller type.

It should be appreciated that CNNs are given purely for sake of example. The ML models of ML models 714 can be based on any appropriate type of machine learning model that can be used to classify vibration data sets. For example, ML models 714 may include long short-term memory (LSTM) models, other recurrent neural networks, etc. Dependent on a type of ML model used, data set preparation module 712 may or may not be included in data set abnormality controller 700. Further, data set preparation module 712 may perform other operations as opposed to and/or in addition to FFTs. In this sense, data set preparation module 712 can be configured and customized to prepare data in a format that can be used as input by ML models 714.

In some embodiments, ML models 714 are optimized for recall (a percentage of faulty machines ML models 714 are able to detect) or precision (a percentage of building devices that ML models 714 classify as faulty that are actually faulty). As ML models 714 catch more fault (i.e., recall increases), a higher number of "false alarms" (i.e., building devices identified as faulty that are operating normally) may increase as well. In other words, as recall increases, precision may decrease and vice-versa.

Model performance of ML models 714 can be tuned by adjusting a probability threshold used to assign normal and abnormal labels to vibration data sets. A higher threshold may result in lower recall and fewer false positives, whereas a lower threshold may achieve high recall (e.g., near 100% recall) but may have more false positives. If a goal of a user and/or data set abnormality controller 700 is to catch as many equipment faults as possible (i.e., near-100% recall) and ensure no critical faults are missed by ML models 714, the probability threshold may be lowered to a value that helps decrease a probability of missed equipment faults. However, the probability threshold may be required to be over a predetermined minimum value (e.g., 10%, 20%, 50%, etc.) such that a number of vibration data sets manually analyzed by analysts is reduced. If an extremely low probability threshold is used (e.g., 0%, 1%, etc.), a large number of vibration data sets that can be safely classified as normal may be unnecessarily qualified as abnormal, thereby increase a workload on analysts. In other words, the probability threshold should be set (e.g., by a user, by data set abnormality controller 700, etc.) such that a number of "acceptable" data sets (i.e., data sets that do not indicate a fault) classified as normal by ML models 714 is maximized while a number of non-acceptable data sets (i.e., data sets that indicate a fault) classified as normal by ML models 714 is minimized.

In some embodiments, the probability threshold is selected respective to types of equipment faults that can occur. For example, equipment faults may be classified as either "alert" faults (i.e., minor faults) or "alarm"/"danger" faults (i.e., critical faults). In this case, alert faults may indicate some fault that may, for example, raise operational costs, but would not be catastrophic to a system if left unaccounted for. Alarm/danger faults, however, may indicate equipment faults that, if left unaccounted for, may result in very large increases in operational costs, system failure, and/or other significant outcomes for a system. Based on the equipment fault classifiers, the probability threshold for ML models 714 can be set respective of the classifiers. For example, a conservative probability threshold may be set such that effectively no alert faults or alarm/danger faults are misclassified as normal. As another example, a less conservative probability threshold for ML models 714 may be set such that a few alert faults may be misclassified but that no alarm/danger fault are misclassified. In some embodiments, the probability threshold is automatically adjusted by data set abnormality controller 700 based on feedback about misclassifications from a user and based on a tolerance for misclassified faults and false positives set by the user (or some other entity).

As a result of passing an FFT spectra for a vibration data set through ML models 714, a set of abnormality probabilities for the FFT spectra can be calculated and provided to an abnormality identifier 716. For a given FFT spectrum, a specific ML model associated with a frequency range (or other aspect) of the FFT spectrum can analyze the FFT spectrum to determine a probability that the FFT spectrum is abnormal. This process can be repeated for each FFT spectrum of the vibration data set such that abnormality identifier 716 can receive an abnormality probability for each FFT spectrum.

Based on a received set of abnormality probabilities for a vibration data set, abnormality identifier 716 can identify/determine whether the vibration data set is abnormal. Abnormality identifier 716 can identify whether the vibration data set is normal or abnormal through a variety of methods. In some embodiments, abnormality identifier 716 determines whether the vibration data set is normal or abnormal by identifying a maximum abnormality probability included in the set of abnormality probabilities. For example, if the FFT spectra of the vibration data set included three FFT spectrums which have respective abnormality probabilities of 10%, 30%, and 60% as determined by ML models 714, abnormality identifier 716 may identify 60% as the maximum abnormality probability. Abnormality identifier 716 can determine whether the maximum abnormality probability is greater than or equal to a threshold probability for abnormality and, if the maximum abnormality is greater than or equal to the threshold probability, can identify the vibration data set as abnormal. Taking the maximum abnormality probability of a received set of abnormality probabilities can be a computationally simple process and can ensure that the vibration data set is treated cautiously to reduce a change of mislabeling the vibration data set as normal if the vibration data set is abnormal.

In some embodiments, abnormality identifier 716 determines a label for the vibration data set based on a model. In this case, abnormality identifier 716 can provide each abnormality probability of the received set of abnormality probabilities to the model to determine whether to classify the vibration data set as normal or abnormal. The model used by abnormality identifier 716 may include a supervised learning algorithm such as, for example, a logistic regression model, a support vector machine (SVM) model, decision trees, etc. Specifically, the model used by abnormality identifier 716 can determine a final probability based on each abnormality probability and can compare the final probability to the threshold probability. Using the model can be helpful in more accurately classifying vibration data sets as normal or abnormal. In particular, using the model in abnormality identifier 716 can reduce an impact of high outlier probabilities in the set of abnormality probabilities. For example, if a first FFT spectrum is associated with an abnormality probability of 80% whereas all other FFT spectra associated with a vibration data set have an abnormality probability less than 5%, the first FFT spectrum may have been misidentified by an ML model of ML models 714. In this example, using the maximum probability may unnecessarily qualify the vibration data set as abnormal whereas the model may determine a final probability that qualifies the vibration data set as normal.

The model utilized by abnormality identifier 716 can be trained to learn which features are particularly important for arriving at a correct label of normal or abnormal for a vibration data set. In some embodiments, the model accounts for differences in how the output probabilities of different models of ML models 714 are calibrated. In some embodiments, the model accounts for additional information such as machine specification values (e.g., gear ratio, line frequency, etc.) to better classify vibration data sets.

In some embodiments, abnormality identifier 716 includes business logic and/or auditing capabilities for further analyzing vibration data sets. In effect, abnormality identifier 716 may include any appropriate functionality for labeling vibration data sets as normal or abnormal. Abnormality identifier 716 is described in greater detail below with reference to FIG. 8.

Based on a received set of abnormality probabilities, abnormality identifier 716 can label an associated vibration data set as normal or abnormal. If abnormality identifier 716 labels the vibration data set as normal, the vibration data set can be provided to a report generator 718 as described in greater detail below. However, if abnormality identifier 716 labels the vibration data set as abnormal, abnormality identifier 716 can provide the abnormal vibration data set to an analyst device 722.

Analyst device 722 can be any device associated with an analyst that can allow the analyst to view a vibration data set and provide feedback about the vibration data set. As such, analyst device 722 may include one or more personal computing devices associated with the analyst. Analyst device 722 may include any wearable or non-wearable device. Wearable devices can refer to any type of device that an individual wears including, but not limited to, a watch (e.g., a smart watch), glasses (e.g., smart glasses), bracelet (e.g., a smart bracelet), etc. Analyst device 722 may also include any type of mobile device including, but not limited to, a phone (e.g., smart phone), a tablet, a personal digital assistant, etc. In some embodiments, analyst device 722 includes other computing devices such as a desktop computer, a laptop computer, etc. Analyst device 722 can be configured to display a graphical user interface including vibration data sets to the analyst and receive user input to the graphical user interface. In some embodiments, analyst device 722 includes a touchscreen. Analyst device 722 may be communicable with the data set abnormality controller 700 via a network, for example a WiFi network, a Bluetooth network, a cellular network, etc.

Via analyst device 722, the analyst can provide analyst feedback. Specifically, the analyst may indicate whether a vibration data set classified as abnormal by abnormality identifier 716 is actually abnormal in the opinion of the analyst. If the analyst indicates the vibration data set is normal, the vibration data set can be provided to report generator 718 such that report generator 718 can generate a "normal" report. However, if the analyst indicates the vibration data set is correctly classified as abnormal by abnormality identifier 716, various corrective actions may be taken to address the abnormality. In some embodiments, one corrective action is to provide the abnormal data set to report generator 718 to generate a report detailing the abnormality. In some embodiments, corrective actions such as maintenance, replacement, and/or other repairs of building equipment 720 may be initiated. For example, a specific building device of building equipment 720 may be scheduled to be replaced based on the analyst indicating an abnormality exists. Corrective actions may be initiated by the analyst via analyst device 722, automatically by abnormality identifier 716 and/or another component of data set abnormality controller 700, and/or by any other entity authorized to initiate corrective actions. In some embodiments, abnormality identifier 716 initiates a corrective action upon identifying the vibration data set as abnormal. In some embodiments, however, abnormality identifier 716 may be restricted in what corrective actions can be taken prior to confirming abnormality with the analyst. In this case, providing the vibration data set to the analyst may be considered a corrective action. Other valid corrective actions the abnormality identifier 716 may initiate may include providing the vibration data set to report generator 718 to generate an initial abnormal report for the vibration data set, alerting a user of user device 724 that abnormality may be present, etc. Abnormality identifier 716 may be restricted, for example, from initiating a corrective action to replace building equipment before confirming abnormality with the analyst.

In some embodiments, abnormality identifier 716 provides abnormal data sets to multiple analyst devices 722. In this case, multiple analysts can review the abnormal data sets and provide feedback. Providing abnormal data sets to multiple analysts can reduce a chance that vibration data sets are mislabeled by analysts. For example, one analyst may accidentally misinterpret an abnormal data set provided by abnormality identifier 716 as normal, thereby missing an equipment fault. However, if the abnormal data set is provided to multiple analysts, the other analysts may detect the equipment fault in the abnormal data set. In some embodiments, if multiple analysts provide feedback on a supposedly abnormal data set, a predetermined percentage of analysts (e.g., 10% of analysts, 30% of analysts, 60% of analysts, etc.) may be required to indicate the supposedly abnormal data is truly abnormal for a corrective action to be initiated. In some embodiments, only one analyst (or another predetermined number of analysts) is required to indicate abnormality in a data set for a corrective action to be initiated.

Labeled vibration data sets can be provided to report generator 718. Based on a vibration data set, report generator 718 can automatically generate a report that can be provided to a user (e.g., a customer) of user device 724. In some embodiments, user device 724 is similar to and/or the same as analyst device 722. As such, user device 724 may be or include, for example, wearable devices, desktop computers, mobile devices, etc.

If a received vibration data set is labeled as normal, report generator 718 may generate a normal report indicating that building equipment is operating normally. If a received vibration data is labeled as abnormal (e.g., as indicated by an analyst), report generator 718 may generate an abnormal report detailing the abnormality. Abnormal reports may include various information that may be helpful to the user. For example, the abnormal report may include what building device of building equipment 720 is experiencing a fault, possible corrective actions that can be taken to address the fault, etc. In effect, the abnormal report can include any information that can help the user make an informed decision on how to proceed with regards to the fault.

Figure 8:
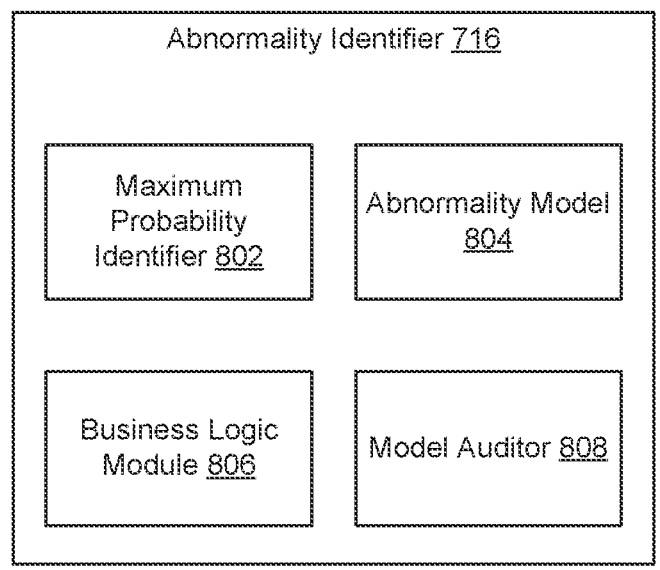
FIG. 8 is a block diagram of an abnormality identifier of the data set abnormality controller of FIG. 7 in greater detail, according to some embodiments.

Referring now to FIG. 8, a block diagram of abnormality identifier 716 in greater detail is shown, according to some embodiments. Abnormality identifier 716 is shown to include a maximum probability identifier 802 and an abnormality model 804. Maximum probability identifier 802 and abnormality model 804 are examples of components that abnormality identifier 716 may include to label vibration data sets based on a set of abnormality probabilities. Specifically, maximum probability identifier 802 may label vibration data sets based on a maximum probability in associated sets of abnormality probabilities whereas abnormality model 804 may described a supervised learning algorithm (e.g., a logistic regression, an SVM, decision trees, etc.) that can label vibration data sets based on sets of abnormality probabilities and/or other information. Maximum probability identification and models for detecting abnormalities are described in greater detail above with reference to FIG. 7.

Abnormality identifier 716 is also shown to include a business logic module 806. Business logic module 806 can perform an analysis to incorporate business logic to further ensure that vibration data sets are not indicative of building equipment faults. Business logic module 806 can account for business logic that may need to be considered before a vibration data set can be automatically labeled. Business logic module 806 can analyze a single set of data (e.g., a set of abnormality probabilities) with the context of past analysis results for data set abnormality controller 700. If the current data is acceptable/normal, but the previous set of data was not normal, additional care may need to be taken with how the data is communicated to the end customer and how vibration data sets are analyzed. For example, business logic module 806 may account for questions such as, "were any repairs performed" or "were there any changes in operating conditions." If, for example, a previous vibration data set was labeled as abnormal and a current vibration data set is so far normal (e.g., as indicated by maximum probability identifier 802 and/or abnormality model 804) but no maintenance has occurred, further analysis may be required. In this case, analysis may be useful to determine why vibrational data has changed from appearing abnormal to appearing normal. Other business logic that can be accounted for by business logic module 806 may include, for example, changes to how customers desire vibration data sets to be labeled, if any operation conditions have changed, etc.

Abnormality identifier 716 is also shown to include a model auditor 808. Model auditor 808 can performed an auditing process to test performance of abnormality model 804. Model auditor 808 may test performance of abnormality model 804 periodically, after a certain amount of vibration data sets are analyzed, responsive to a user/analyst request for auditing, etc.

For model auditor 808 to perform the auditing process, a vibration data set will need to capture that it has been approved by abnormality model 804 and has passed a business logic test performed by business logic module 806, but that it was flagged for audit. Based on the audit flag, model auditor 808 can go back and have the vibration data set analyzed by an analyst. If the vibration data set passes human analysis, then model auditor 808 may determine abnormality model 804 worked correctly. However, if the vibration data set fails the human analysis process (i.e., the analyst indicates the vibration data set is abnormal), then abnormality model 804 should be reviewed. It should be noted that the auditing performed by model auditor 808 should take place after the business logic test performed by business logic module 806, because if the business logic test fails, then the human analysis result might differ for reasons not related to the current set of data, which is not tested for. It should also be noted that, if abnormality model 804 is not used to label vibration data sets (e.g., if maximum probability identifier 802 is used to label vibration data sets), model auditor 808 may or may not be a component of abnormality identifier 716.

Components of abnormality identifier 716 shown in FIG. 8 are provided purely for sake of example. Abnormality identifier 716 can include any relevant components for performing abnormality identification of abnormality probabilities for vibration data sets.

Figure 9:
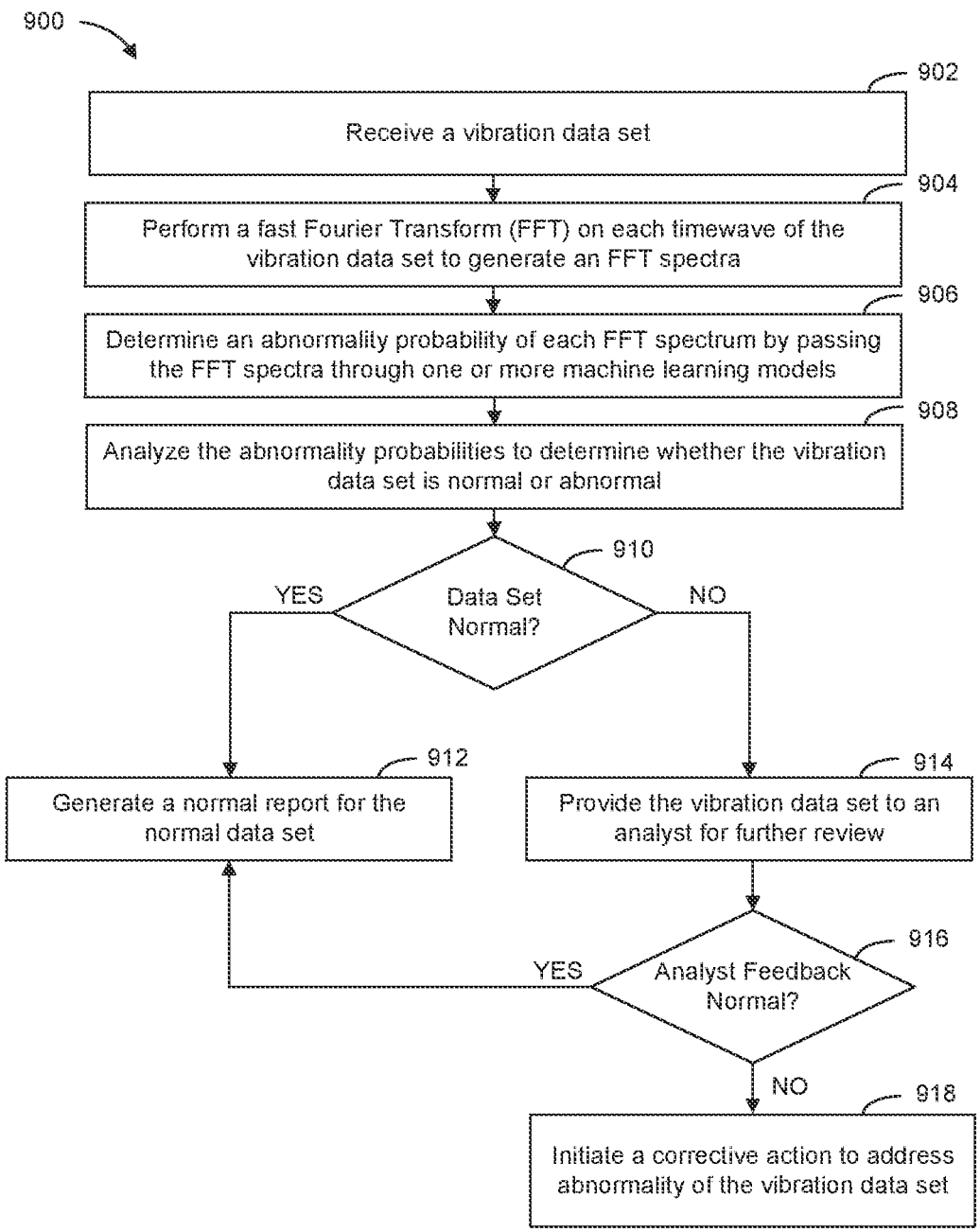
FIG. 9 is a flow diagram of a process for generating reports for a vibration data set, according to some embodiments.

Referring now to FIG. 9, a flow diagram of a process 900 for generating reports for a vibration data set is shown, according to some embodiments. Process 900 can outline how data set abnormality controller 700 can operate to analyze a vibration data sets to determine if the vibration data set is normal or abnormal. As such, some and/or all steps of process 900 may be performed by data set abnormality controller 700 and/or components therein.

Process 900 is shown to include receiving a vibration data set (step 902). The vibration data set can include raw vibration measurements of a building device. The raw vibration measurements may indicate how the building device is vibrating in three-dimensional space at one or more locations across the building device as indicated by timewaves. The timewaves can indicate acceleration over time measurements of the building device. In some embodiments, step 902 is performed by data set collector 710.

Process 900 is shown to include performing a fast Fourier Transform (FFT) on each timewave of the vibration data set to generate an FFT spectra (step 904). Performing FFTs on the timewaves can help represent the timewaves in a frequency domain such that the vibration data sets can be more easily processed. The FFT spectra generated in step 904 can include one or more individual spectra that describe the timewaves in the frequency domain for a specific range of frequencies. In some embodiments, step 904 includes performing other operations on the vibration data set dependent on a model format (e.g., CNN, LSTM, etc.) used in later in process 900. In this sense, step 904 can be considered a data preparation step that prepares data use by one or more models. In some embodiments, step 904 is performed by data set preparation module 712.

Process 900 is shown to include determining an abnormality probability of each FFT spectrum by passing the FFT spectra through one or more machine learning models (step 906). In some embodiments, step 906 includes an ML model for each range of frequencies associated with the FFT spectra. In this way, each frequency range can have a specialized ML model for predicting abnormality probabilities for a given frequency range. The one or more ML models can, based on a FFT spectrum, calculate a probability that the FFT spectrum indicates an abnormality of building equipment. In some embodiments, step 906 includes generating a set of abnormality probabilities that includes a probability that each FFT spectrum is abnormal. In some embodiments, step 906 is performed by ML models 714.

Process 900 is shown to include analyzing the abnormality probabilities to determine whether the vibration data set is normal or abnormal (step 908). Step 908 may include various operations to analyze the abnormality probabilities. For example, step 908 may include determining a maximum abnormality probability of all abnormality probabilities. In this case, if the maximum abnormality probability is greater than or equal to a threshold probability, the vibration data set may be considered abnormal. As another example, step 908 may include passing the abnormality probabilities through an additional model that has learned how to associate abnormality probabilities to whether a vibration data set is normal or abnormal. In some embodiments, step 908 is performed by abnormality identifier 716.

Process 900 is shown to include determining if the vibration data set is normal (step 910). Step 910 can be performed based on the analysis performed in step 908. If the vibration data set is normal (step 910, "YES"), process 900 can proceed to step 912. If the vibration data set is abnormal (step 910, "NO"), process 900 can proceed to step 914. In some embodiments, step 910 is performed by abnormality identifier 716.

Process 900 is shown to include generating a normal report for the normal data set (step 912). If step 912 is performed, the vibration data set received in step 902 may be normal. As such, a normal data set can be generated and provided to a user (e.g., a customer) indicating that building equipment is operating as expected and that no faults are detected. In some embodiments, if the user indicates they do not wish to receive reports if no issues are present, step 912 may or may not be included in process 900. In some embodiments, step 912 is performed by report generator 718.

Process 900 is shown to include providing the vibration data set to an analyst for further review (step 914). If step 914 is performed, the analyst can be relied upon to provide further feedback regarding whether the vibration data set is actually abnormal. Step 914 may include providing the vibration data set to an analyst device. In some embodiments, information regarding why the vibration data set was labeled as abnormal in step 908 is provided to the analyst. For example, the analyst may be provided sections of the FFT spectra that were identified as potentially abnormal. In some embodiments, step 914 is performed by abnormality identifier 716.

Process 900 is shown to include determining if feedback from the analyst indicates the vibration data set is normal (step 916). If the analyst indicates the vibration data set is normal, process 900 can proceed to step 912. If the analyst indicates the vibration data set is abnormal, process 900 can proceed to step 918. In some embodiments, step 916 is performed by abnormality identifier 716.

Process 900 is shown to include initiating a corrective action to address abnormality of the vibration data set (step 918). Responsive to the analyst indicating the data set is abnormal, the corrective action can be initiated. The corrective action may include various actions such as, for example, generating a report indicating the abnormality, scheduling maintenance/repair/replacement of building equipment to be performed, disabling a building device with a fault, obtaining further feedback from analysts, etc. In some embodiments, step 918 is performed by data set abnormality controller 700.

Figure 10:
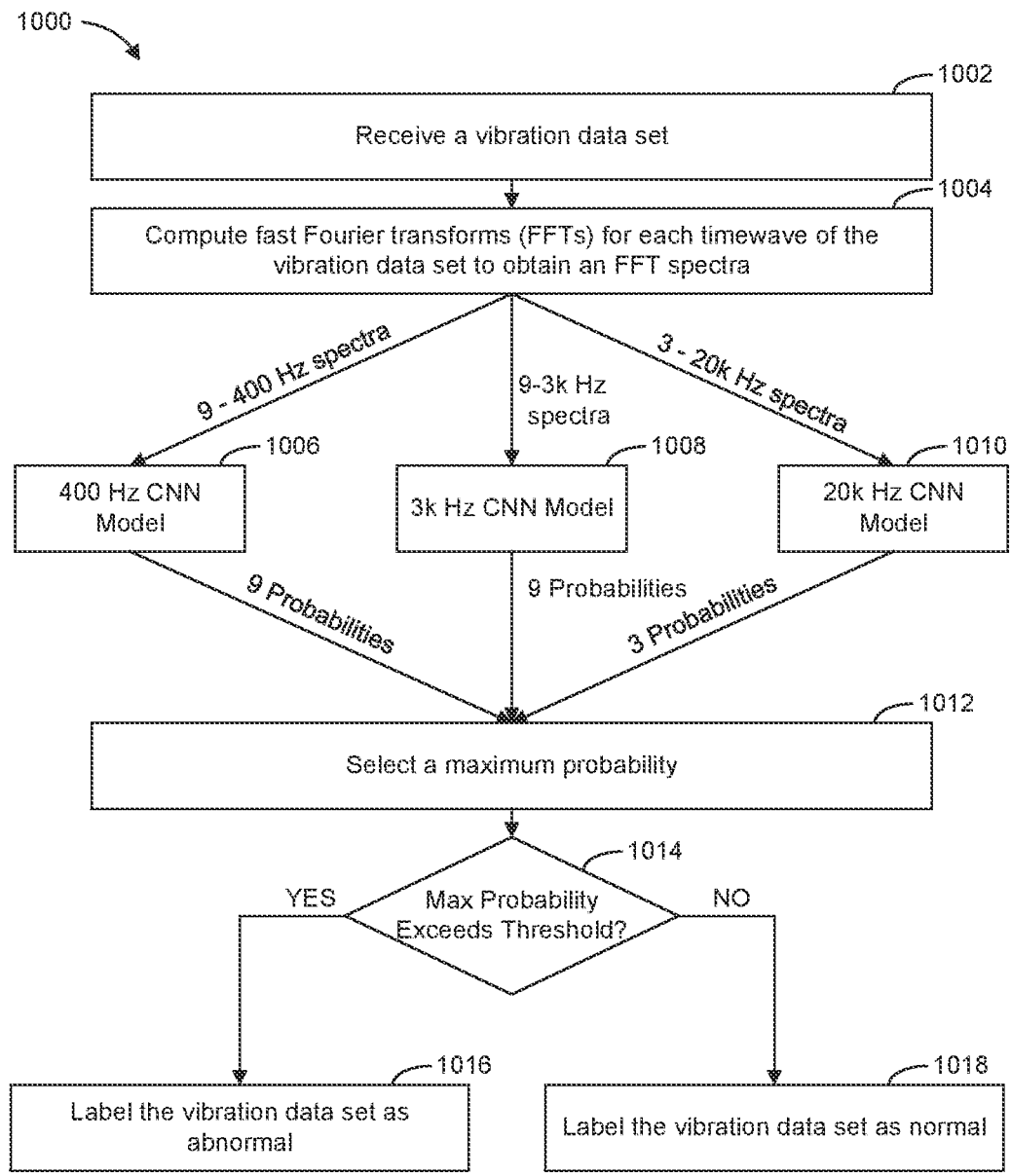
FIG. 10 is a flow diagram of an example process for determining whether a vibration data set for a chiller is normal or abnormal, according to some embodiments.

Referring now to FIG. 10, a flow diagram of an example process 1000 for determining whether a vibration data set for a chiller is normal or abnormal is shown, according to some embodiments. In particular, process 1000 can illustrate an example of identifying faults of a chiller in a vibration data set using multiple models to analyze different aspects of the vibration data set. In some embodiments, some and/or all steps of process 1000 are performed by data set abnormality controller 700.

Process 1000 is shown to include receiving a vibration data set (step 1002). The vibration data set received in step 1002 can describe vibrational data for a chiller, according to some embodiments. In some embodiments, step 1002 is similar to and/or the same as step 902 as described with reference to FIG. 9. In the example of process 1000, historical vibration data may be stored in the form of Fast Fourier Transforms (FFTs) calculated from accelerometer data for a standard set of frequency ranges and resolutions. Data can be collected at various physical locations and orientations on a device. In particular, high-resolution, low frequency 400 Hz spectra can be used to diagnose issues with components such as the motor shaft, electrical, and compressor shaft of the chiller. Lower-resolution, high frequency 20 kHz spectra may provide insight into a condition of an impeller and gear set. Mid-range frequency 3 kHz spectra may indicate ball bearing function. In some embodiments, step 1002 is performed by data set collector 710.

Process 1000 is shown to include computing fast Fourier transforms (FFTs) for each timewave of the vibration data set to obtain an FFT spectra (step 1004). In some embodiments, step 1004 is similar to and/or the same as step 904 of process 900. With respect to the example of process 1000, step 1004 may result in 21 FFTs being computed based on the vibration data set. In particular, 1004 may result in identification of nine 400 Hz spectra, nine 3,000 Hz spectra, and three 20,000 Hz spectra. In some embodiments, step 1004 is performed by data set preparation module 712.

Process 1000 is shown to include providing the FFT spectra computed in step 1004 to a 400 Hz CNN model 1006, a 3 k Hz CNN model 1008, and a 20 k Hz CNN model 1010. Models 1006-1010 can be used to determine probabilities that a given frequency range of the FFT spectra include an abnormality. It should be noted that, while models 1006-1010 are described below as convolutional neural networks, models 1006-1010 may include other machine learning models used to generated predictions of abnormality probabilities.

Prior to receiving the FFT spectra, models 1006-1010 can be trained to properly predict abnormality probabilities. In some embodiments, models 1006-1010 are trained based on a training data set, validated based on a validation data set used for hyper-parameter and architecture tuning, and a test data set used for performance evaluation of models 1006-1010. Said data sets may be retrieved from a database including historical data sets. It should be noted that, performance on the validation data set can motivate improvements to models 1006-1010 and that the test data set may be ignored during model-tuning. In the example of process 1000, Only historical vibration datasets that include all 9 400 Hz spectra (i.e., 0.25 Hz resolution for CA, CH, CV, MOA, MOH, MOV, MDA, MDH, MDV), all 9 3000 Hz spectra (i.e., 0.9375 Hz resolution for CA, CH, CV, MOA, MOH, MOV, MDA, MDH, MDV), and all 3 20 kHz spectra (i.e., 6.25 Hz resolution for CA, CH, CV) are considered for the overall ML model, though additional spectra from incomplete datasets may be used for training the individual CNN models.

The labels used for training and evaluation of models 1006-1010 may correspond to a device condition assigned by vibration analysts. Each of the historical datasets can be evaluated by a human analyst. After analyzing the Fourier transforms computed from the accelerometer data as indicated in vibration data sets, an analyst may either designate a device as being in an "acceptable" condition, or may put the device in "alert," "alarm," or "danger" states in increasing level of severity. If in an unacceptable condition, the components responsible for the unacceptable condition may also be indicated by the analyst. For example, a machine may be put into "alert" because a ball bearing defect is suspected by the analyst. Faults for more than one component may be suspected and indicated in the historical dataset. Based on the data sets, models 1006-1010 can be retrained, validated, and tested to ensure models 1006-1010 generate appropriate probability predictions.

With specific regards to 400 Hz CNN model 1006, 400 Hz CNN model 1006 can evaluate all 0-400 Hz FFT spectra in the vibration data set. In the case of process 1000, 9 spectra exist in the 0-400 Hz frequency range. 400 Hz CNN model 1006 can utilize various features in generating a probability output such as, for example, a physical location of a sensor on a device (e.g., on a compressor, on an off-end, on a drive-end, etc.), a physical orientation of the sensor on the device (e.g., axial, horizontal, vertical, etc.), a line frequency in Hz (e.g., 50 Hz, 60 Hz), raw spectral data (e.g., a series of amplitudes in IPS for all FFT bins in the spectrum), etc. In this case, physical location, orientation, and line frequency can be one-hot encoded. All auxiliary features (non-spectral features) can be standardized according to the training set distribution. The raw spectral data can be truncated to start at 25 Hz and scaled by a global amplitude mean and standard deviation of the training set. Further, it can be assumed by 400 Hz CNN model 1006 that all devices have 2-pole motors. If this assumption is invalid, the number of poles should be included as a feature of 400 Hz CNN model 1006.

In some embodiments, 400 Hz CNN model 1006 considers dataset-level labels assigned by a vibration analyst for certain components of the chiller. For example, 400 Hz CNN model 1006 may consider labels such as "motor shaft," "electrical," "low-speed compressor shaft," and "high-speed compressor shaft." Each of these numeric component labels can range from 0 (acceptable) to 3 (danger). A maximum value of the four labels can be considered the "full sample label" and can be binarized to 0 (acceptable) or 1 (abnormal) for model training. Each spectrum belonging to the same dataset can be assigned the same label, regardless of whether abnormal spectral features are visible.

In some embodiments, 400 Hz CNN model 1006 is a one-dimensional CNN with fully-connected layers at the end for classification. Table 1 below illustrates an example architecture of 400 Hz CNN model 1006. In Table 1, "Conv1D" can indicate a one-dimensional convolutional type layer, "MaxPool1D" can indicate a one-dimensional max pooling type layer, and "FC" can indicate a fully connected layer.

TABLE 1

400 Hz CNN Model Architecture

| Layer | Type | Filter Count | Size | Stride | Activation |
|---|---|---|---|---|---|
| 0 | Input | — | 1501 | — | — |
| 1 | Conv1D | 32 | 7 | 3 | ReLU |
| 2 | MaxPool1D | — | 3 | 2 | — |
| 3 | Conv1D | 64 | 5 | 1 | ReLU |
| 4 | MaxPool1D | — | 3 | 2 | — |
| 5 | Conv1D | 28 | 3 | 1 | ReLU |
| 6 | Conv1D | 28 | 3 | 1 | ReLU |
| 7 | Conv1D | 28 | 3 | 1 | ReLU |
| 8 | MaxPool1D | — | 3 | 2 | ReLU |
| 9 | FC | — | 200 | — | ReLU |
| 10 | FC | — | 50 | — | ReLU |
| 11 | FC | — | 50 | — | ReLU |
| 12 | Output | — | 1 | — | Sigmoid |

TABLE 1-continued

It should be appreciated that in Table 1, all layers use ReLU activation, except for the binary classification layer which uses "sigmoid." L2 regularization (lambda=1.0) can be applied to each layer, as well as batch normalization. Auxiliary features (e.g., non-FFT amplitudes) are added to the flattened convolutional features before the first fully connected layer. The binary cross-entropy loss can be minimized with an Adam optimization process ($lr=1e^{-4}$).

In training 400 Hz CNN model 1006, mini-batches of 512 can be used for training such that samples are weighted according to a full sample label. In particular, sample labels of 0, 1, 2, and 3 can have sample weights of 0.1, 0.6, 1.0, and 1.0 respectively. Sample weighting may be helpful in obtaining reasonable performance of 400 Hz CNN model 1006 as a data set used to train 400 Hz CNN model 1006 may be imbalanced (e.g., 85% normal samples and 15% abnormal samples). In this example, 400 Hz CNN model 1006 was trained on 113 k spectra, validated on 30 k spectra, and test on 36 k spectra. Model training for 400 Hz CNN model 1006 is stopped if an F1 score of the validation set does not increase in 10 epochs. Following hyper-parameter tuning with the validation data set, a best-performing model can be chosen by taking the model with the highest metric value of precision at a recall of 0.96.

3 k Hz CNN model 1008 can evaluate all 0-3000 Hz FFT spectra in a dataset. For a typical chiller dataset, there may be 9 3 kHz spectra as shown in process 1000. 3 k Hz CNN model 1008 may be relatively similar to 400 Hz CNN model 1006. However, 3 k Hz CNN model 1008 may only consider a single dataset label of "ball bearing." Likewise, an example architecture of 3 k Hz CNN model 1008 can be provided in Table 2 below.

TABLE 2

3k Hz CNN Model Architecture

| Layer | Type | Filter Count | Size | Stride | Activation |
|---|---|---|---|---|---|
| 0 | Input | — | 3176 | — | — |
| 1 | Conv1D | 32 | 7 | 3 | ReLU |
| 2 | MaxPool1D | — | 3 | 2 | — |
| 3 | Conv1D | 64 | 5 | 1 | ReLU |
| 4 | MaxPool1D | — | 3 | 2 | — |
| 5 | Conv1D | 28 | 3 | 1 | ReLU |
| 6 | Conv1D | 28 | 3 | 1 | ReLU |
| 7 | Conv1D | 28 | 3 | 1 | ReLU |
| 8 | MaxPool1D | — | 3 | 2 | ReLU |
| 9 | FC | — | 200 | — | ReLU |
| 10 | FC | — | 50 | — | ReLU |
| 11 | FC | — | 50 | — | ReLU |
| 12 | Output | — | 1 | — | Sigmoid |

As with 400 Hz CNN model 1006, all layers of 3 k Hz CNN model 1008 use ReLU activation except for the binary classification layer which used sigmoid. L2 regularization (lambda=100.0) can be applied to each layer as well as batch normalization. In 3 k Hz CNN model 1008, a Gaussian noise layer (0.005) can be placed after the input layer. As with 400 Hz CNN model 1006, auxiliary features (e.g., non-FFT amplitudes) can be added to the flattened convolutional features before the first fully connected layer. The binary cross-entropy loss can be minimized with the Adam optimization ($1r=1e^{-4}$).

Advantageously, 3 k Hz CNN model 1008 can be trained via transfer learning with 400 Hz CNN model 1006. Specifically, model weights for convolutional layers of 3 k Hz CNN model 1008 can be initialized with final weights from trained 400 Hz CNN model 1006. Weights for convolutional layers through layer 3 can be fixed during training. Mini-batches of 1024 can be used for training, where samples are weighted according to their full sample label. Specifically, 3 k Hz CNN model 1008 may include sample labels 0, 1, 2, and 3 with respective sample weights of 0.1, 1.0, 1.4, and 1.4. In this case, the dataset may be imbalanced (91% normal samples and 9% abnormal samples) so sample-weighting may be required for reasonable performance. In this example, 3 k Hz CNN model 1008 is trained on 113 k spectra, validated on 30 k spectra, and tested on 36 k spectra. As with 400 Hz CNN model 1006, model training is stopped if the F1 score of the validation set does not increase in 10 epochs.

Finally, 20 k Hz CNN model 1010 can evaluate all 0-20,000 Hz FFT spectra in a dataset. For a typical chiller dataset, there are 3 20 kHz spectra as shown in process 1000. As with models 1006 and 1008, 20 k Hz CNN model 1010 can utilize specific features. For example, 20 k Hz CNN model 1010 may utilize a physical orientation of a sensor on a building device, a linear frequency in Hz, a gear ratio, a number of gear teeth, a number of impeller blades, and raw spectra data. Further, 20 k Hz CNN model 1010 may utilize labels including "gear set" and "impeller." An example architecture of 20 k Hz CNN model 1010 can be provided in Table 3 below.

TABLE 3

20k Hz CNN Model Architecture

| Layer | Type | Filter Count | Size | Stride | Activation |
|---|---|---|---|---|---|
| 0 | Input | — | 3193 | — | — |
| 1 | Conv1D | 32 | 7 | 3 | ReLU |
| 2 | MaxPool1D | — | 3 | 2 | — |
| 3 | Conv1D | 64 | 5 | 1 | ReLU |
| 4 | MaxPool1D | — | 3 | 2 | — |
| 5 | Conv1D | 28 | 3 | 1 | ReLU |
| 6 | Conv1D | 28 | 3 | 1 | ReLU |
| 7 | Conv1D | 28 | 3 | 1 | ReLU |
| 8 | MaxPool1D | — | 3 | 2 | ReLU |
| 9 | FC | — | 200 | — | ReLU |
| 10 | FC | — | 50 | — | ReLU |
| 11 | FC | — | 50 | — | ReLU |
| 12 | Output | — | 1 | — | Sigmoid |

In 20 k Hz CNN model 1010, L2 regularization (lambda=10.0) can be applied to each layer as well as batch normalization. A Gaussian noise layer (0.03) can be placed after the input layer. As with models 1006 and 1008, auxiliary features (e.g., non-FFT amplitudes) can be added to the flattened convolutional features before the first fully connected layer. Likewise, binary cross-entropy loss can be minimized with the Adam optimization ($1r=1e^{4}$).

As with 3 k Hz CNN model 1008, 20 k Hz CNN model 1010 can be trained via transfer learning by initializing the convolutional layers with final weights from the trained 400 Hz CNN model 1006. Weights for convolutional layers through layer 5 can be fixed during training. In this case, mini-batches of 1024 can be used for training. Samples can be weighted according to their full sample label such that labels 0, 1, 2, and 3 are associated with sample weights 0.1, 2.0, 3.0, and 3.0 respectively. The dataset associated with 20 k Hz CNN model 1010 is imbalanced (91% normal samples and 9% abnormal samples), and so sample-weighting may be required for reasonable performance. 20 k Hz CNN model 1010 was trained on 37 k spectra, validated on 10 k spectra, and tested on 12 k spectra. Similar to models 1006 and 1008, model training is stopped if the F1 score of the validation set does not increase in 10 epochs.

After the appropriate FFT spectra are provided to each of models 1006-1010, each of models 1006-1010 can generate a relevant set of abnormality probabilities. In particular, 400 Hz CNN model 1006 can generate 9 probabilities, 3 k Hz CNN model 1008 can generate 9 probabilities, and 20 k Hz CNN model 1010 can generate 3 probabilities.

Process 1000 is shown to include selecting a maximum probability (step 1012). The outputs of the three spectrum models 1006-101 (400 Hz, 3 kHz, 20 kHz) can be combined to arrive at the final condition score for the machine. In step 1012, a maximum probability value can be assigned to the 21 spectra as the overall probability that the vibration data set is abnormal. In some embodiments, step 1012 is performed by abnormality identifier 716.

Process 1000 is shown to include determining if the maximum probability exceeds a threshold (step 1014). If the maximum probability value exceeds the probability threshold (step 1014, "YES"), process 1000 can proceed to step 1016. If the probability is below the threshold (step 1014, "NO"), process 1000 may proceed to step 1018. The probability threshold can be chosen using the training set with consideration to performance trade-offs. For example, a threshold of 0.4108 may correspond to a 70% false positive rate for the training data set and may result in automatically passing through 30% of acceptable (normal) data sets. In some embodiments, step 1014 is performed by abnormality identifier 716.

Process 1000 is shown to include labeling the vibration data set as abnormal (step 1016). If the vibration data set is labeled as abnormal, the vibration data set may be effectively flagged for analyst review. In some embodiments, step 1016 is performed by abnormality identifier 716.

Process 1000 is shown to include labeling the vibration data set as normal (step 1018). Data sets labeled as normal (acceptable) may bypass human review and move directly to the automatic report generation. In some embodiments, step 1018 is performed by abnormality identifier 716.

Figure 11:
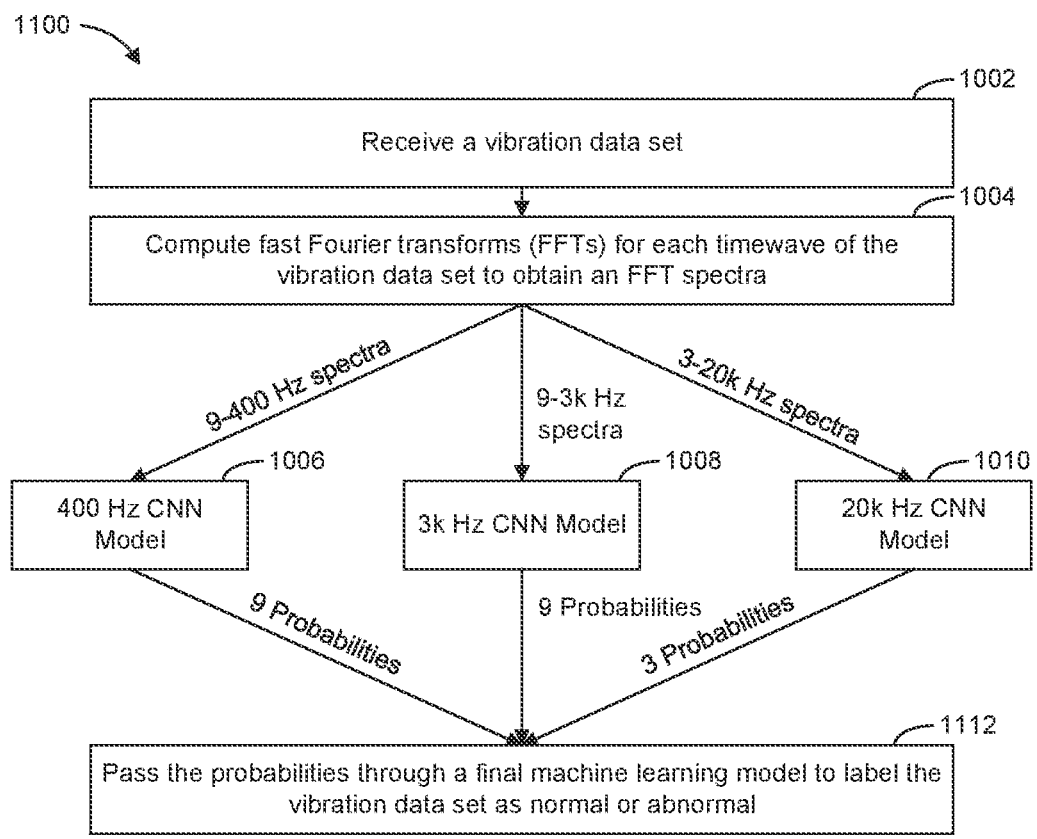
FIG. 11 is a flow diagram of a process for labeling vibration data sets as normal or abnormal, according to some embodiments.

Referring now to FIG. 11, is a flow diagram of a process 1100 for labeling vibration data sets as normal or abnormal is shown, according to some embodiments. In some embodiments, process 1100 is similar to process 1000. As such, process 1100 is shown to include steps 1002-1004 and models 1006-1010 of process 1000. In some embodiments, process 1100 is performed by data set abnormality controller 700.

Process 1100 is shown to include passing the probabilities through a final machine learning model to label the vibration data set as normal or abnormal (step 1112). Unlike process 1000, process 1100 can utilize an additional machine learning model that can generate a final probability based individual probabilities determined by models 1006-1010. The final ML model may be or include, for example, a logistic regression, an SVM, decision trees, etc. Advantageously, the final ML model can be trained to account for additional considerations such as how each of models 1006-1010 were trained, what spectra are most associated with faults, etc. In this way, the final ML model can gather a more complete picture of building equipment faults as supposed to using the maximum probability of all probabilities as described in process 1000. In some embodiments, step 1112 is performed by ML models 714.

Edge Device with Vibration Anomaly Detection

Figure 12:
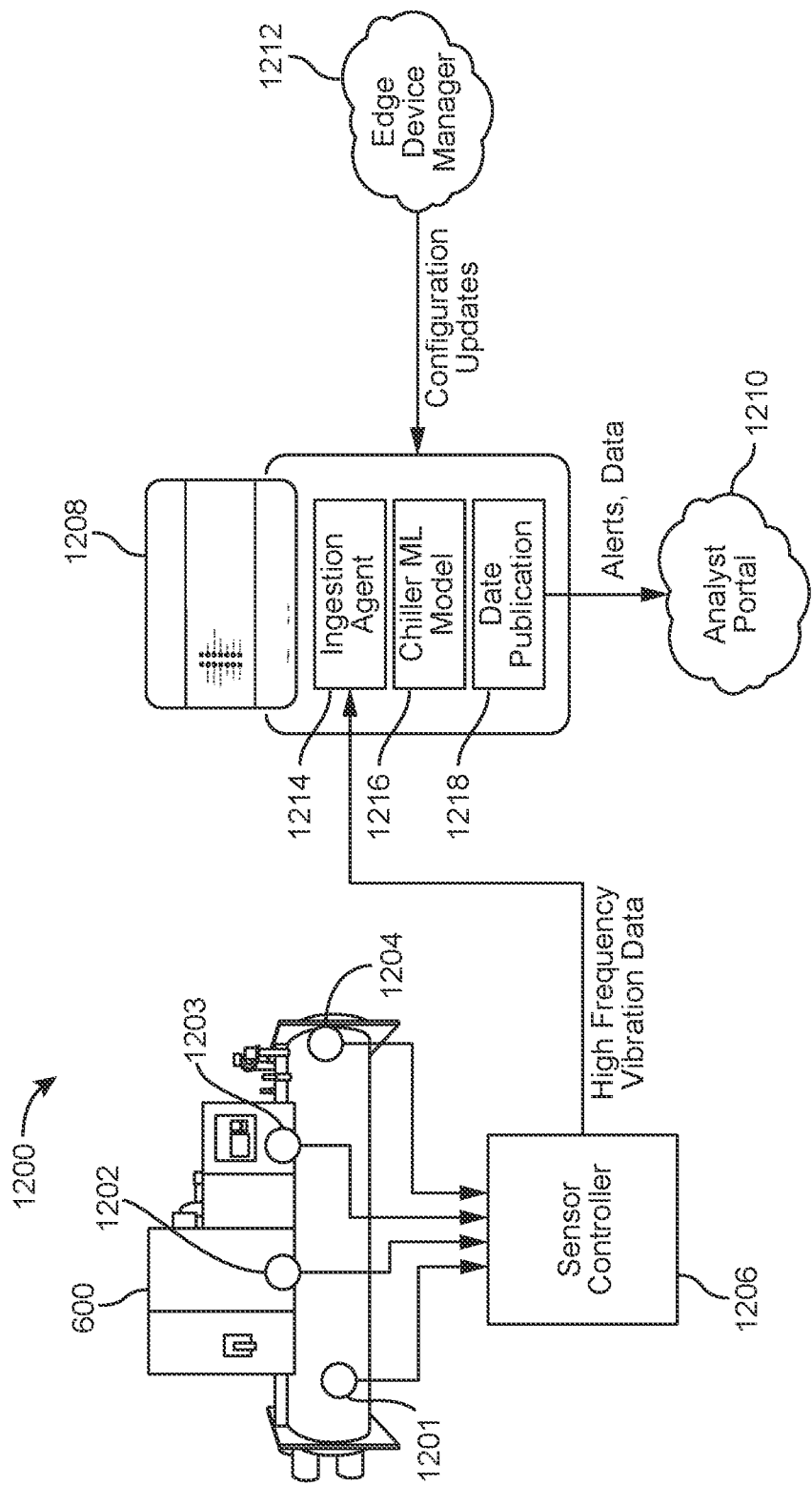
FIG. 12 is a block diagram of a system with vibration analysis at the edge, according to some embodiments.

Referring now to FIG. 12, a system 1200 providing vibration analysis at the edge is shown, according to some embodiments. The system 1200 can provide various features and advantageous relating to vibration analysis described above while being implemented at the edge, which reduces communications bandwidth usage and latency-related challenges while facilitating execution of the teachings herein under unstable or sporadic network connections. An implementation at the edge can include providing the features herein on memory and processing circuitry of one or more devices proximate (physically and/or with respect to a network architecture) or included in sensors, meters, equipment, etc. that directly affect or measure conditions of the building or equipment. Such memory and processing circuitry can access data and, in some embodiments, take control actions, without transmittal of data over a communications network (e.g., Internet, etc.) to a data center (either on site or off site), such that computations are provided at the edge of any such network architecture.

The system 1200 is shown as including a chiller 600 with a first sensor 1201, a second sensor 1202, a third sensor 1203, and a fourth sensor 1204 mounted on the chiller 600 at multiple positions, a sensor controller 1206 communicably coupled to the sensors 1201-1204, a gateway (edge gateway) 1208 communicably coupled to the sensor controller 1206, and an analyst portal 1210 and an edge device manager 1212 communicable with the gateway 1208 via a communications network (e.g., the Internet).

The sensors 1201-1204 are accelerometers or other vibration sensors configured to measure vibrations of the chiller 600. Vibrations may be caused by operation of various components of the chiller 600 and abnormalities in chiller vibration can be indicative of operational issues with the chiller which can be proactively mitigated or avoided if detected early by monitoring vibrations measured by the sensors 1201-1204. In some embodiments, the sensors 1201-1204 provide analog signals via two-wire connections to the sensor controller 1206. In other embodiments, the sensors 1201-1204 output sensor data in a digital format to the sensor controller 1206 or, in some embodiments in which the sensor controller 1206 is omitted, directly to the gateway 1208 (e.g., via a wired or wireless connection). The sensors 1201-1204 can each collect data at a frequency greater than 10,000 Hz, for example greater than 15,000 Hz (e.g., 25,000 Hz, 50,000 Hz, 100,000 Hz).

The sensor controller 1206 is configured to receive measurements (e.g., in the form of analog signals) from the sensors 1201-1204 and process the measurements in real-time in order to provides a stream of vibration data to the gateway 1208. In some embodiments, the sensor controller 1206 digitizes analog signals from the sensors 1201-1204 to obtain vibration data that can be communicated to the gateway 1208 via an Ethernet or other data connection. A low-latency or zero-latency communication protocol can be used for communicating the vibration data. The vibration data from the multiple sensors 1201-1204 can be sent in parallel to the gateway 1208 (e.g., four sets of continuous data) or in sequence, for example by cycling through providing data from the first sensor 1201 for a set amount of time, data from the second sensor 1202 for a set amount of time, data from the third sensor 1203 for a set amount of time, and data from a fourth sensor 1204 for a set amount of time (e.g., based on adjustable parameters). One or more streams of vibration data can thus be provided to the gateway 1208 by the sensor controller 1206.

The gateway 1208 is arranged between the sensor controller 1206 and one or more communications networks (e.g., IT networks, Internet, etc.), and thus also between the sensors 1201 and the one or more communications networks. Vibration data reaches the gateway 1208 from the sensor controller 1206 (e.g., via an Ethernet cable) and without transmittal over other communications networks (e.g., building network, IT network, Internet, etc.). The gateway 1208 may be physically arranged proximate the chiller 600. In some embodiments, the gateway 1208 and/or the sensor controller are coupled to the chiller 600, contained inside a housing of the chiller 600, distributed on a shared platform (skid, pallet, etc.) as the chiller 600, and/or otherwise packaged with the chiller 600.

The gateway 1208 includes memory and processing circuitry programmed to performed various operations, including ingesting streams of vibration data, performing signal processing on the streams of vibration data to obtain inputs for a machine learning model, determining whether an abnormality is occurring by applying the inputs to the machine learning model, and causing a subset of the vibration data to be communicated to a first computing system via the communications network in response to a determination that the abnormality is occurring. As shown in FIG. 12, the gateway 1208 includes an ingestion agent 1214, a chiller ML layer 1216, and a data publication layer 1218 which can be implemented on memory and processing circuitry of the gateway 1208 and which are described in further detail below with reference to FIG. 13. In other embodiments, the edge ingestion, machine learning, and data publication features attributed herein to the gateway 1208 are provided by some other edge element of the system 1200, for example locally on the sensor controller 1206, sensors 1201-1204, and/or chiller 600, all of which are considered edge devices herein.

FIG. 12 illustrates the gateway 1208 as providing alerts and data to analyst portal 1210. The analyst portal 1210 may be or include the analyst device 722. In the example shown, the analyst portal 1210 is one or more servers or cloud-based computing resource(s) that host an analyst dashboard that can be accessed by a device (e.g., analyst device 722), for example via a web browser. The analyst portal 1210 can provide an analyst with access to a set of abnormal vibration data in response to a detected abnormality and may be enabled to collect analyst feedback relating to a detected abnormality, for example as described above with reference to the analyst device 722 and/or steps 914 and 916 of process 900.

Figure 16:
FIG. 16 is a first view of a manager interface for the system of FIG. 12, according to some embodiments.
Figure 17:
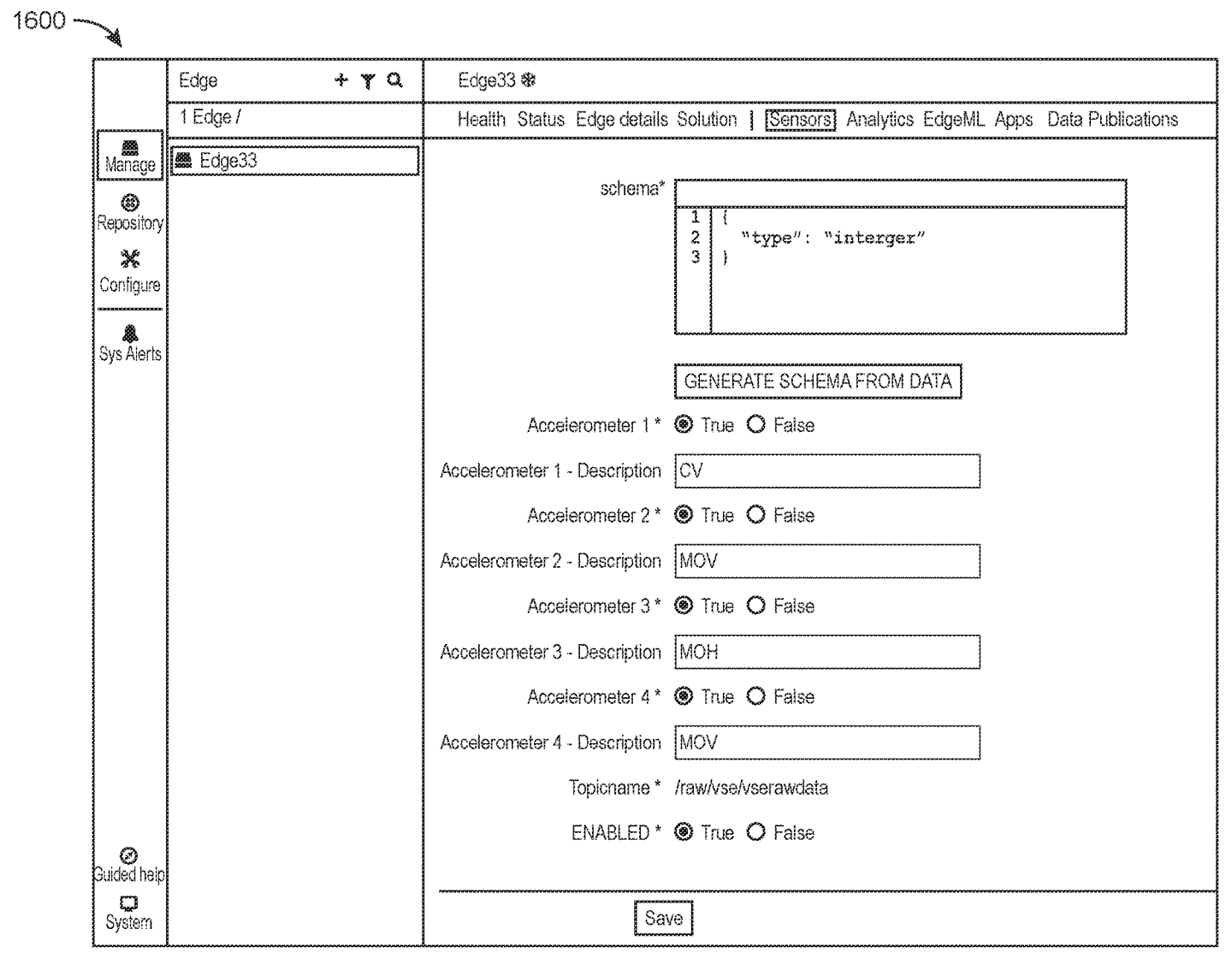

FIG. 12 also illustrates the gateway 1208 as receiving configuration updates form an edge device manager 1212. The edge device manager 1212 is shown as being hosted at a server remote from the gateway 1208 (e.g., by cloud resource) and may provide interface features accessible via a web browser from a personal computing device. The edge device manager 1212 can be configured to receive user selections of configurations, settings, parameter values, etc. for the gateway 1208 and/or to automatically generate such selections, for example sensor parameters, sample rates, sensor sequencing or cycling settings, etc. The edge device manager 1212 can also be configured to provide rules, logic (e.g., expression-based logic, via a reactive, functional programming language), models (e.g., ML model) to the gateway 1208 for execution thereon. In some embodiments, the edge device manager 1212 contributes to a process which trains a machine learning model remotely from the gateway 1208, reduces the trained machine learning model to a smaller or lighter edge version (i.e., demanding less memory and/or computing power to run as compared to an original version), and provides the edge version of the machine learning model to the edge gateway 1208 for use locally at the edge. In some embodiments, the edge device manager 1212 includes features described in U.S. Pat. No. 10,977,010, filed Apr. 21, 2020, the entire disclosure of which is incorporated by reference herein. Example user interfaces that can be provided by the edge device manager 1212 are shown in FIGS. 16-17 and described with reference thereto below.

Figure 13:
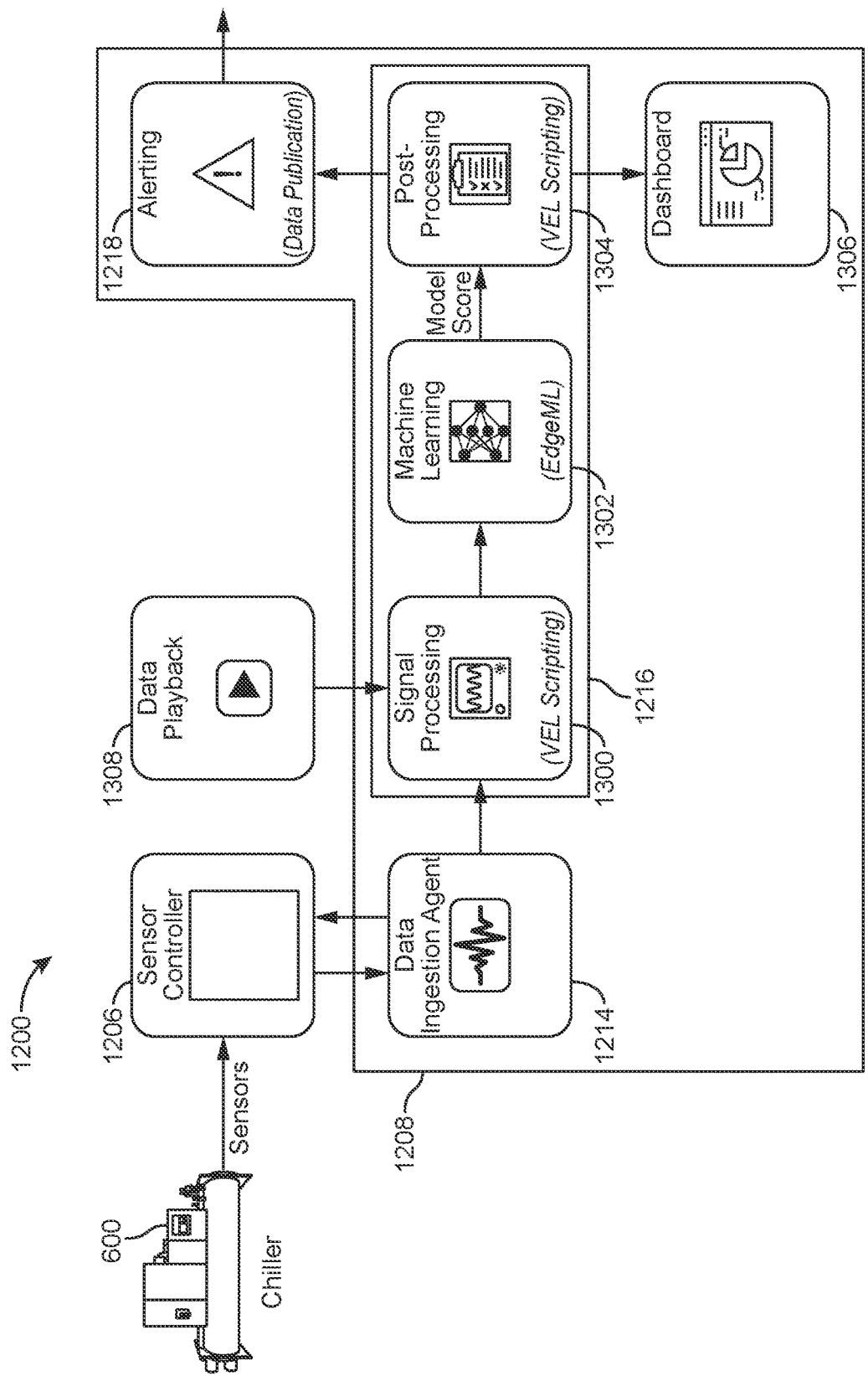
FIG. 13 is another block diagram of the system of FIG. 12, according to some embodiments.

Referring now to FIG. 13, another diagram of the system 1200 is shown, according to some embodiments. FIG. 13 shows the gateway 1208 as including the ingestion agent 1214, the chiller ML layer 1216, the data publication layer 1218, and a dashboard layer 1306. The chiller ML layer 1216 is shown as including a signal processing block 1300, a machine learning model 1302, and a post-processing block 1304. The system 1200 is shown as also including a data playback device 1308, which can be included in the sensor controller 1206 or the edge gateway 1208 or provided as a separate device in various embodiments. The data playback device 1308 can be configured to provide vibration data from an earlier time for processing by the chiller ML layer 1216, which may be useful in some scenarios.

Figure 14:
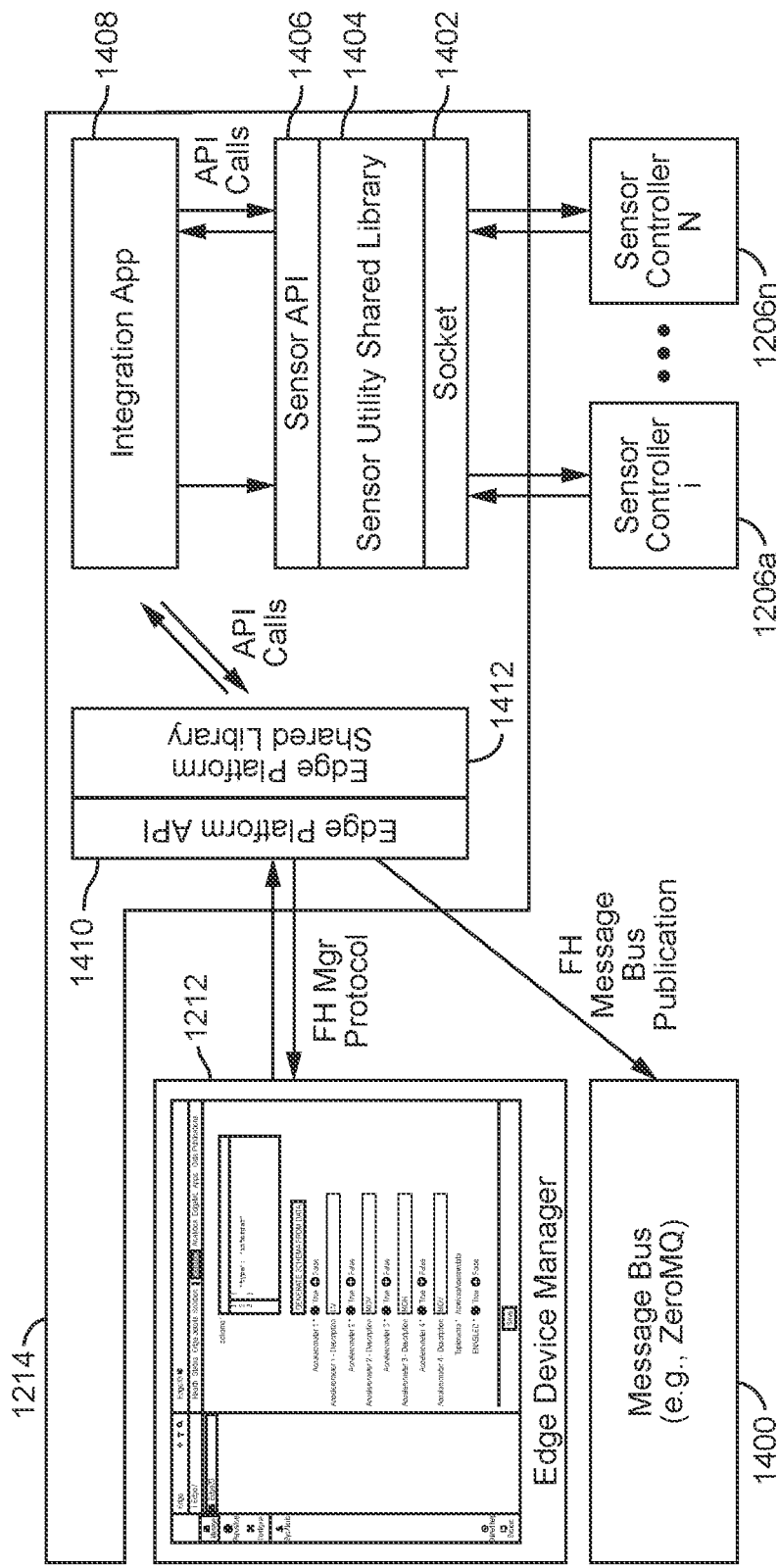
FIG. 14 is a schematic illustration of data ingestion in the system of FIG. 12, according to some embodiments.

As illustrated in FIG. 13, data is ingested from the sensor controller 1206 by ingestion agent 1214, for example in substantially real-time (e.g., with low or zero latency). A detailed view of the ingestion agent 1214 in some embodiments is shown in FIG. 14 and described with reference thereto. FIG. 13 illustrates data flowing from the ingestion agent to the signal processing block 1300 of the edge ML layer 1216. FIG. 13 also illustrates the ingestion agent 1214 as providing information back to the sensor controller 1206, for example configuration or control parameters for use by the sensor controller 1206.

The signal processing block 1300 is configured to execute logic that provides signal processing of vibration data ingested by the ingestion agent 1214 via a reactive, functional programming language in order to generate inputs for the machine learning model 1302. In some embodiments, the signal processing block 1300 determines fast Fourier transforms (FFTs) of the vibration data, for example using real-time dataflow processing and/or pattern recognition techniques to products the FFTs in real-time and/or in a substantially continuous manner. In some embodiments, the signal processing block 1300 adapts real-time dataflow processing techniques as described in U.S. Pat. No. 10,572,230, filed Apr. 23, 2017, U.S. Pat. No. 10,564,941, filed Mar. 23, 2017, and/or U.S. Pat. No. 10,628,135, filed Nov. 13, 2018, all of which are incorporated by reference herein.

The inputs generated by the signal processing block 1300 are provided to the machine learning model 1302. The machine learning model 1302 is configured to output one or more probabilities (scores, etc.) based on the inputs to the machine learning model 1302 (e.g., based on FFTs of vibration data). The one or more probabilities corresponding to likelihoods that abnormalities are present in the vibration data. The machine learning model 1302 may be provided in a Tensorflow Lite Runtime environment (tflite_runtime), which can contribute to reducing a size of the machine learning model 1302 to enable use on edge gateways having limited memory and processing capabilities, for example with less than two gigabytes of memory (e.g., less than one gigabyte of memory). The machine learning model 1302 may be trained locally on the edge gateway 1208 or can be trained remotely and then provided to the edge gateway 1208. In some embodiments, the machine learning model 1302 is periodically updated, for example via updates provided to the edge gateway 1208 by the edge device manager 1212. The machine learning model 1302 may use various teachings disclosed in U.S. patent application Ser. No. 16/379,700, filed Apr. 9, 2019, the entire disclosure of which is incorporated by reference herein. In some embodiments, multiple machine learning models are provided on the edge gateway 1208, for example as described with reference to FIG. 10 above.

The post-processing block 1304 is configured to post-process outputs of the machine learning model 1302 (e.g., probabilities, scores), for example to determine whether an abnormality is occurring. In some embodiments, the post-processing block 1304 compares a probability output by the machine learning model 1302 to a threshold value and determines that an abnormality is occurring if the probability exceeds the threshold value (and determines that an abnormality is not occurring if the probability does not exceed the threshold value). In some embodiments, the post-processing block 1304 makes a determination corresponding to step 910 of FIG. 9. The post-processing block 1304 can execute programming in a reactive, functional programming language to provide the post-processing, for example expression-based logic created, selected, modified, etc. by the edge device manager 1212. The post-processing block 1304 can provide its determinations to the data publication layer 1218 and/or the dashboard layer 1306.

In some embodiments, the post-processing block 1304 determines a trend associated with the abnormality. The trend may be based on post-processing of outputs of the machine learning model 1302. In some embodiments, the trend is determined from stored data associated with detected abnormalities. In some embodiments, the processing pipeline including the machine learning model 1302 may execute on streaming data, such that a stream of outputs are provided from the machine learning model 1302 to the post-processing block 1304 and can be monitored in real-time to determine a trend associated with the abnormality. In some embodiments, complex event processing based on a functional, reactive programing language can be executed by the post-processing block 1304 for real-time trend analysis on streaming outputs of the machine learning model 1302, for example.

In some embodiments, the trend determined by the post-processing block 1304 is indicative of changes in the abnormality, for example a rate of change in a degree of the abnormality (e.g., severity of the abnormality, extent of the abnormality, etc.). In such embodiments, the post-processing block 1304 can distinguish between abnormalities which are remaining substantially constant and abnormalities which are worsening (e.g., further deviating from normal), for example identifying when an abnormality has changed by more than a threshold amount. The trend can then be used to distinguish new abnormalities or substantial changes in an abnormality (for which alerts or corrective actions may be suitable) from substantially constant abnormalities (for which repeated/additional alerts or corrective actions may be redundant and undesirable).

In some embodiments, the post-processing block 1304 can compare the trend to a criterion (e.g., a threshold value, etc.), for example a criterion checking whether the abnormality is new, whether the abnormality is significantly changed relative to an earlier time, whether the abnormality has been present for a certain duration, etc. If the trend satisfies the criterion, the edge device 1208 can be caused to provide an alert to the analyst portal 1210 as described below. If the trend does not satisfy the criterion, the edge device 1208 abstains from providing the alert.

The data publication layer 1218 is configured to either provide an alert and data to the analyst portal 1210 or abstain from providing an alert and data to the analyst portal 1210 based on whether the chiller ML layer 1216 determines that an abnormality is occurring. The data publication layer 1218 provides a set of vibration data to the analyst portal 1210 if the chiller ML layer 1216 determines than an abnormality is occurring, and abstains from transmitting vibration data from the gateway 1208 in the absence of such a determination. Network bandwidth is thus only used to transmit a set of vibration data when an abnormality is occurring, saving bandwidth and other networking requirements as compared to other scenarios where vibration data is constantly streamed or frequently uploaded to a remote system which may use multiple megabytes per second of bandwidth. The data publication layer 1218 may provide vibration data for several seconds in time corresponding to the determined abnormality to the analyst portal 1210 for analysis by an analyst as described elsewhere herein. As such, kilobytes of data (e.g., less than 1 MB) can be infrequently (e.g., in response to abnormalities) transmitted to the analyst portal 1210.

Advantageously, in some embodiments the processing pipeline provided by the edge device 1208 (including data ingestion steps by data ingestion agent 1214, signal processing steps by signal processing block 1300, machine learning steps by machine learning block 1302, and post-processing steps by block 1304) works on streaming vibration data without storing the input or output data of each step. A buffering may be used if one step is not able to immediately process the data of a preceding step. Such embodiments can operate with any intermediate storage for the purpose of the data processing logic, reducing hardware requirements and improving the timeliness of data processing.

Figure 15:
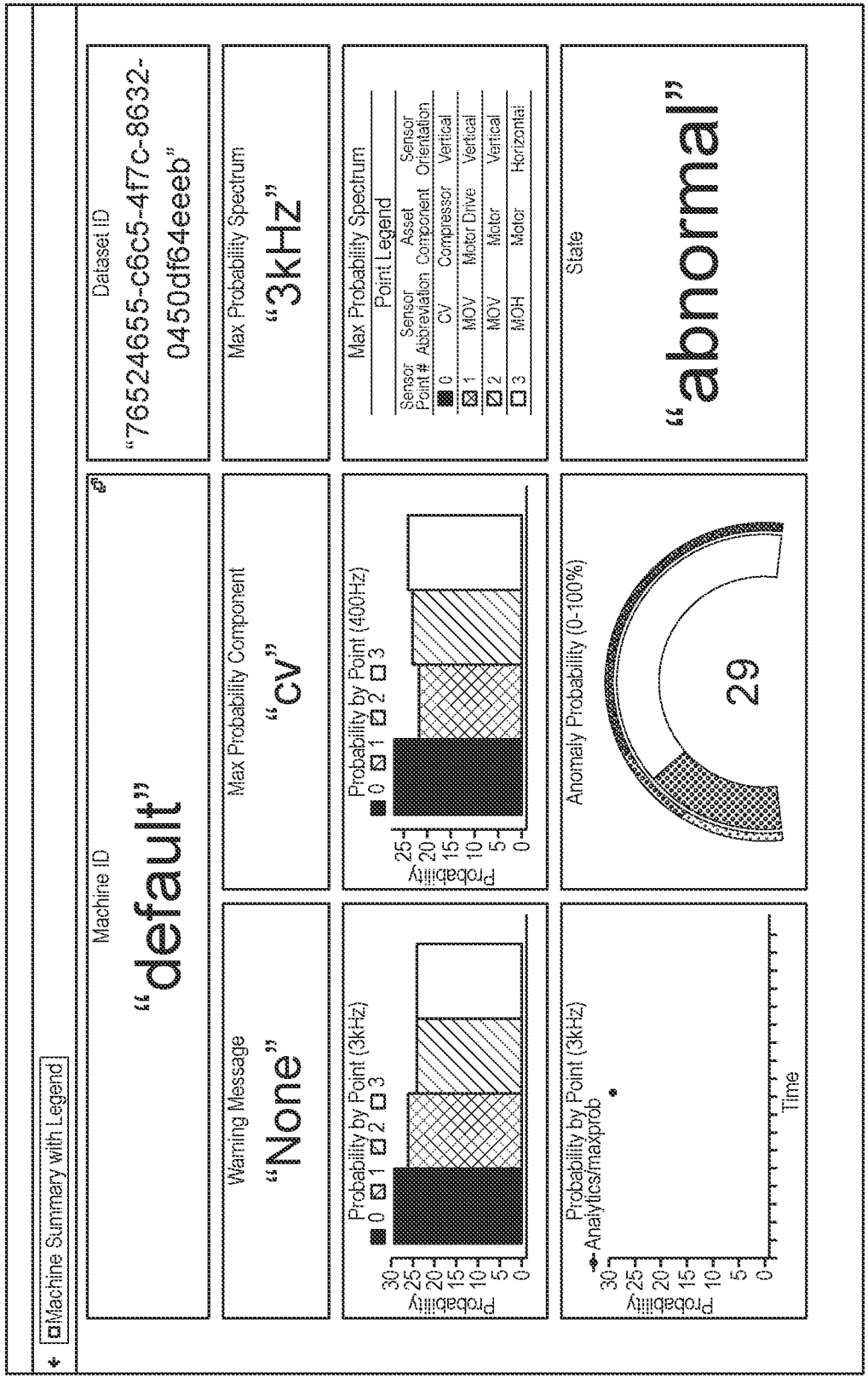
FIG. 15 is an illustration of a dashboard that can be provided by the system of FIG. 12, according to some embodiments.

The dashboard layer 1306 is configured to host a dashboard that can be accessed to visualize information relating to the vibration data processed by the edge gateway 1208. For example, the dashboard layer 1306 may host the dashboard in a manner that is accessible via a browser of a personal computing device in communication with the edge gateway 1208 (e.g., directly in communication over a wireless access point of the edge gateway 1208, communicable with the edge gateway 1208 via an intranet or the Internet, etc.). FIG. 15 shows a dashboard 1500 that can be hosted by the dashboard layer 1306, according to some embodiments. As shown in FIG. 15, the dashboard 1500 can include various widgets indicating whether an abnormality is detected, showing an overall probability of an abnormality, providing probabilities of abnormalities by sensor for each of multiple sensors, showing descriptions of the sensors (e.g., orientation, component of the equipment to which each sensor is mounted), equipment identification (name, model, etc.), any warning messages, a plot of probability (anomaly score) over time, and/or other widgets for visualizing vibration-related data and insights. The edge gateway 1208 is thus able to self-host a dashboard which displays information relating to vibration of the chiller 600, in some embodiments.

Referring now to FIG. 14, a diagram of a portion of the system 1200 is shown, according to some embodiments. In particular, the ingestion agent 1214 is shown in detail with communications to multiple sensor controllers 1206 (shown as sensor controller i 1206*a* through sensor controller N 1206*n*), edge device manager 1212, and a message bus 1400 used by the edge gateway 1208.

As shown in FIG. 14, sensor controller i 1206*a* through sensor controller N 1206*n* are connected to socket (ports) 1402. The socket 1402 may be a TCP/IP socket which can communicate with the sensor controller i 1206*a* through sensor controller N 1206*n* over TCP/IP. For example, sensor controller i 1206*a* through sensor controller N 1206*n* can be connected to the socket 1402 by Ethernet cables. Inclusion of sensor controllers i 1206*a* through sensor controller N 1206*n* illustrates that any number of sensor controllers and sensors can be used with an edge gateway 1208 and included in system 1200 in various embodiments.

The socket 1402 is provided along with a sensor utilities shared library 1404, for example a library associated with the sensor controllers 1206, for example including programming from a manufacturer of the sensor controllers 1206. The sensor utilities shared library 1404 can include programming which facilitates receipt of vibration data from sensor controller i 1206*a* through sensor controller N 1206*n* at the socket 1402. A utilities application programming interface 1406 is provided with the sensor utilities shared library 1404 to enable interoperability between the sensor utilities shared library 1404 and an integration app 1408.

The integration app 1408 uses the utilities application programming interface 1406 to interoperate with the sensor utilities shared library 1404 and uses an edge platform application programming interface 1410 to interoperate with an edge platform shared library 1412 which itself interfaces with chiller ML model 1216 (e.g., signal processing block 1300, machine learning model 1302, and/or post-processing block 1304), thereby integrating functions of the edge platform shared library with functions of the sensor utilities shared library 1404. The integration app 1408 uses API calls with the edge platform application programming interface 1410 and the utilities application programming interface 1406. In some embodiments, the integration app 1408 is a modular application which can be selected for use via the edge device manager 1212 and adapted to handle a communications protocol used by the sensor controllers 1206 and/or the sensor utilities shared library 1404, for example to translate, reformate, etc. vibration data into a format useable by the edge platform shared library 1412 and/or other elements of the gateway 1208. In some embodiments, the edge device manager 1212 provides various parameters, setting, expression-based logic, rules, etc. for use by the edge platform shared library 1412, the integration app 1408, the sensor utilities shared library 1404, or the sensor controllers 1206.

The edge platform shared library 1412 can include functions that are executable to provide vibration data onto the message bus 1400, which may be a ZeroMQ message bus, for example. Interoperation between the various components of the data ingestion agent 1214 can cause vibration data to be provided onto the message bus 1400 in a low or zero latency manner. In some embodiments, the chiller ML layer 1216 (e.g., the signal processing block 1300) can then obtain the vibration data form the message bus 1400. The data ingestion agent 1214 is thereby configured to provide high frequency (e.g., greater than 10,000 Hz) data samples to the message bus 1400 in a low or zero latency manner, which can enable, for example, substantially real-time dataflow processing of one or more streams of vibration data by downstream elements of the gateway 1208.

Referring now to FIG. 16, a configuration page 1600 that can be provided by the edge device manager 1212 is shown, according to some embodiments. The configuration page 1600 can be hosted by the edge device manager 1212 and accessed by a personal computing device, for example over the Internet. In the example shown, the configuration page 1600 allows a user to edit parameters of a sensor controller 1206. For instance, the configuration page 1600 allows a user to change a display name of the sensor controller 1206, choose the IP address of the sensor controller 1206, select a port number of the sensor controller 126, indicate whether a user datagram protocol is used, define a sample frequency for collection of sensor data by the sensor controller 1206, select a recording time for data samples, select a cycle time for data samples (e.g., such that data is selected for the recording time for each sensor as each cycle time elapses), select a security level for the sensor controller 1206, and select a password for the sensor controller 1206. The edge device manager 1212 is programmed to receive such selections of parameters, settings, etc. via the configuration page 1600 and in some embodiments cause reprogramming or other modification of the sensor controller 1206 via communication with the edge gateway 1208. The system 1200 is thus updated to operate in accordance with user-selected preferences input to the configuration page 1600.

Referring now to FIG. 17, a sensor information page 1700 that can be provided by the edge device manager 1212 is shown, according to some embodiments. The sensor information page 1700 can be hosted by the edge device manager 1212 and accessed by a personal computing device, for example over the Internet. In the example shown, the sensor information page 1700 allows a user to view and edit information about sensors (e.g., sensors 1201-1204) including descriptions of the sensors that may be indicative of where the sensors are positioned on a unit of equipment, for example. The sensor information page 1700 can also allow a user to choose to activate ("true" as shown in FIG. 17) or deactivate ("false" as shown in FIG. 17) each particular sensor, or to enable or disable all sensors as a group. Other options relating to a protocol and/or schema for the sensors can be selected manually and/or using an option to automatically detect or generate such details. Selections entered via the sensor information page 1700 can be provided form the edge device manager 1212 to the edge gateway 1208 and/or the sensor controller 1206 to reconfiguration the edge gateway 1208 and/or sensor controller 1206 in accordance with such selections. Various other settings, options, adjustments, values, thresholds, models, logic, etc. can be selected via interfaces hosted by the edge device manager 1212 to adjust operation of the system 1200 in various embodiments.

Figure 18:
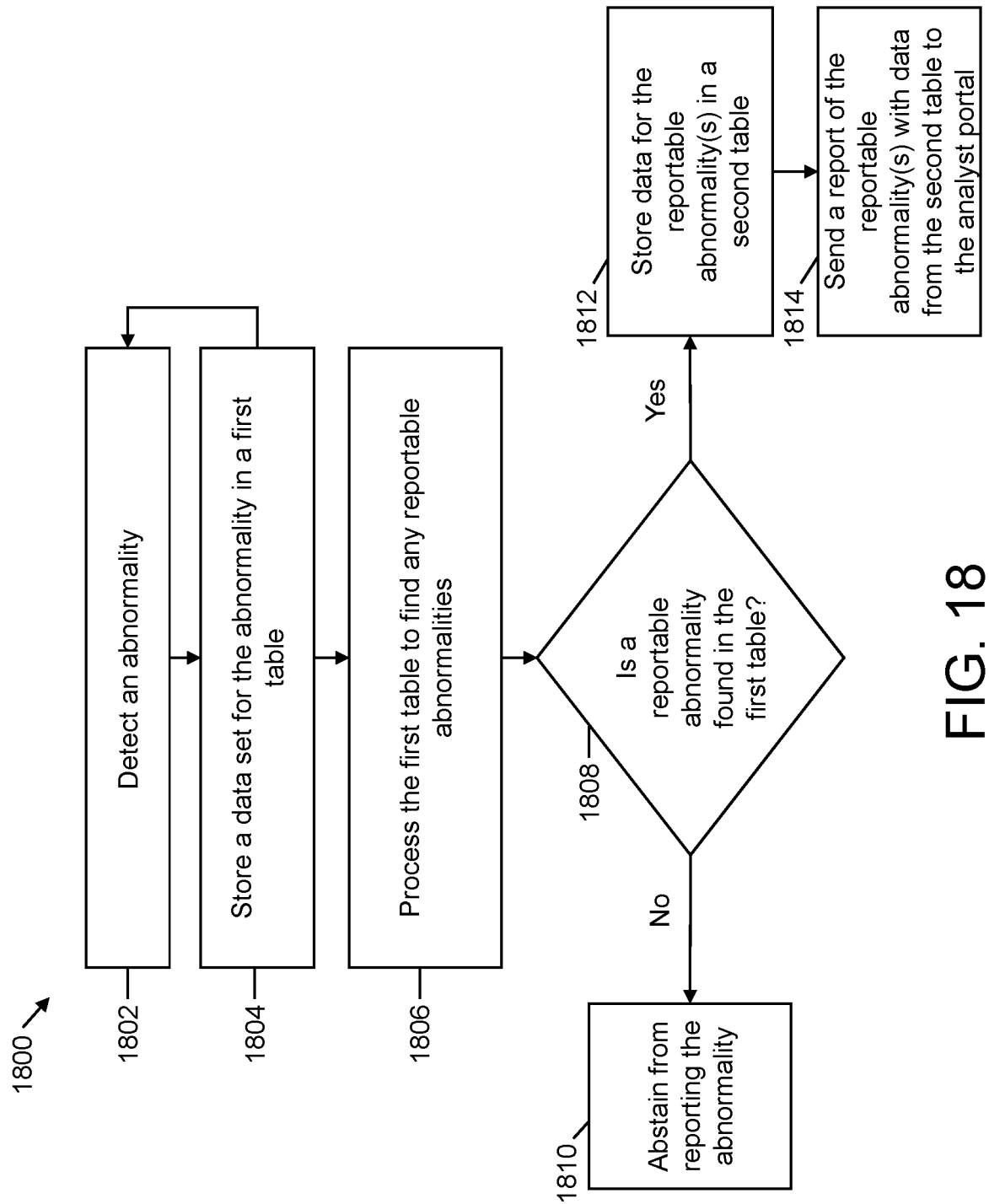
FIG. 18 is a flowchart of a process for post-processing detected abnormalities, according to some embodiments.

Referring now to FIG. 18, a flowchart of a process 1800 for automatically determining whether to abstain from reporting an abnormality or reporting an abnormality is shown, according to some embodiments. The process 1800 can be performed by the edge device 1208, for example by the post-processing block 1304 or the data publication layer 1218. The process 1800 can address a technical challenge associated with over-reporting of abnormalities as may occur in other embodiments. For example, for continuing abnormalities, it may be undesirable for an alerting or analyst process to be triggered repeatedly while the abnormality continues to occur, especially where abnormality detection is configured to operate at a high frequency, because an analyst or other process may be overwhelmed by alerts relating to the same abnormality that continues to occur over time. Accordingly, a solution which can automatically post-process detected abnormalities to identify abnormalities or changes therein which are desirable to report is advantageous for avoiding overloads of information, alarm fatigue, etc.

At step 1802, an abnormality is detected. The abnormality may be detected using a machine learning model as described above. In response to the abnormality being detected, at step 1804, a data set for the abnormality is stored in a first table. The data set may include raw vibration data, inputs to the machine learning model, outputs of the machine learning model, or any other data available at the edge device 1208 for a predetermined or dynamically determined amount of time leading up to the time at which the abnormality is detected and/or following the time at which the abnormality is detected Steps 1802-1804 can be repeated multiple times over a time period (e.g., daily, weekly), such that the remaining steps of process 1800 can be performed for periodically (e.g., daily, weekly) in some embodiments. Data sets for multiple abnormalities or a continuing abnormality can thus be stored in the first table.

At step 1806, the first table is processed to find any reportable abnormalities. Processing can include assessing a duration of an abnormality, assessing whether an abnormality is new (i.e., detected for a time period following a time period with normal vibration data), assessing a change in the abnormality (e.g., a change in a degree/severity of the abnormality), etc. In some embodiments, complex event processing is used in step 1806 to find the reportable abnormalities. The algorithms applied in step 1806 can be customized, selected, etc. via the edge device manager 1212 in various embodiments, for example allowing a user to select threshold degrees of abnormality, durations, etc. defining one or more criteria used in step 1806.

At step 1808, a determination is made as to whether a reportable abnormality is found in the first table, i.e., based on the output of step 1806. If not, ("no" at step 1808), the process 1800 proceeds to step 1810 where the process 1800 abstains from reporting any abnormalities. Reporting is thereby suppressed if step 1806 determines an abnormality or set of abnormalities to not be worth reporting (i.e., do not qualify as reportable abnormalities) based on one or more criteria.

If one or more reportable abnormalities are determined ("yes" at step 1808), the process 1800 proceeds to step 1812 where data for the one or more reportable abnormalities is stored in a second table. Then, at step 1814, a report is sent of the one or more reportable abnormalities, for example from the edge device 1208 to the analyst portal 1210. Additional data and alerts are thereby shared to the analyst portal 1210 for abnormalities determined to be reportable by step 1806. Such data and alerts can then be reviewed by a human analyst, in some embodiments, without noise (distraction, overwhelming amounts of information, infeasible-to-humanly-understand amounts of information, etc.), or otherwise processed (e.g., for automated corrective actions) in various embodiments as described with respect to other figures herein.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system, comprising:
 a plurality of vibration sensors configured to be coupled to a unit of building equipment;
 an edge device arranged between the plurality of vibration sensors and a communications network, wherein the edge device is programmed to detect an abnormality in vibration data from the plurality of vibration sensors by:
  ingesting streams of vibration data from the plurality of vibration sensors;
  performing signal processing on the streams of vibration data to obtain inputs for a machine learning model;
  determining whether the abnormality is occurring by applying the inputs to the machine learning model;
  determining a trend associated with the abnormality based on outputs of the machine learning model, wherein the trend characterizes a change in a degree of the abnormality or a duration of the abnormality; and
  causing a portion of the vibration data to be communicated to a first computing system via the communications network in response to the trend satisfying a criterion, wherein the edge device is programmed to compare the trend to the criterion to distinguish new abnormalities or substantial changes in abnormalities from substantially constant abnormalities.

2. The system of claim 1, further comprising a sensor controller electrically arranged between the plurality of vibration sensors and the edge device, the sensor controller configured output the streams of vibration data to the edge device via an Ethernet connection and based on signals received at the sensor controller from the plurality of vibration sensors via two-wire connections.

3. The system of claim 1, wherein the machine learning model used by the edge device is an edge version of the machine learning model adapted from a cloud version of the machine learning model.

4. The system of claim 1, further comprising a second computing system communicable with the edge device via the communications network, wherein the second computing system is programmed to modify settings of the edge device and/or of the plurality of vibration sensors in accordance with one or more selections made by a user via a dashboard hosted by the second computing system.

5. The system of claim 4, wherein the one or more selections comprise a configuration parameter for a first sensor of the plurality of vibration sensors.

6. The system of claim 4, wherein the one or more selections comprise a preprocessing logic to be applied to the streams of vibration data via a reactive, functional programming language.

7. The system of claim 1, wherein determining whether the abnormality is occurring further comprises outputting probabilities from the machine learning model and comparing the probabilities to one or more thresholds.

8. The system of claim 1, wherein the inputs comprise fast Fourier transform spectra of the streams of vibration data.

9. The system of claim 1, wherein determining the trend comprises post-processing the outputs of the machine learning model using complex event processing.

10. The system of claim 1, wherein the edge device is further programmed to cause the unit of building equipment to automatically take a corrective action in response to detecting the abnormality.

11. An edge device, comprising:
 an input port configured to receive vibration data indicative of vibration of a unit of building equipment;
 circuitry programmed to detect an abnormality in the vibration data by:
  ingesting one or more streams of the vibration data;
  performing signal processing on the one or more streams of vibration data to obtain inputs for a machine learning model;
  determining whether the abnormality is occurring by applying the inputs to the machine learning model; and
  in response to a determination that the abnormality is occurring, determining a trend associated with the abnormality, wherein the trend characterizes a change in a degree of the abnormality or a duration of the abnormality; and
 a communications interface configured to cause a subset of the vibration data to be communicated to a first computing system via a communications network in response to a determination that the trend satisfies a criterion and abstain from causing the subset of vibration data to be communicated to the first computing system in response to a determination that the trend does not satisfy the criterion, wherein the edge device is programmed to compare the trend to the criterion to distinguish new abnormalities or substantial changes in abnormalities from substantially constant abnormalities.

12. The edge device of claim 11, wherein the circuitry is further configured to cause the unit of building equipment to take a corrective action in response to detecting the abnormality.

13. The edge device of claim 11, wherein the circuitry is reprogrammable in response to instructions received from a second computing system via the communications interface, the instructions causing an adjustment of a parameter associated with a sensor providing the vibration data or logic based on a reactive, functional programming language used by the circuitry in detecting the abnormality.

14. The edge device of claim 11, wherein determining whether the abnormality is occurring further comprises outputting probabilities from the machine learning model and comparing the probabilities to one or more thresholds and wherein the trend is based on changes in the probabilities.

15. The edge device of claim 11, wherein the inputs comprise fast Fourier transform spectra of the streams of vibration data.

16. A method, comprising:
   measuring, by one or more sensors, vibration of a unit of building equipment;
   ingesting, by an edge device, one or more streams of vibration data from the one or more sensors;
   performing, by the edge device, signal processing on the one or more streams of vibration data to obtain inputs for a machine learning model;
   determining, by the edge device, a trend of an abnormality by applying the inputs to the machine learning model and post-processing an output of the machine learning model;
   abstaining, by the edge device, from communicating the vibration data over a communications network to a first computing system unless the trend satisfies a criterion; and
   modifying, by a second computing system communicable with the edge device via the communications network, settings of the edge device and/or the one or more sensors in accordance with one or more selections made by a user via a dashboard hosted by the second computing system.

17. The method of claim 16, wherein the trend characterizes a change in a degree of the abnormality or a duration of the abnormality, and wherein the method comprises comparing, by the edge device, the trend to the criterion to distinguish new abnormalities or substantial changes in abnormalities from substantially constant abnormalities.

18. The method of claim 16, further comprising customizing logic used in the steps of ingesting, performing, and/or determining by modifying programming of the edge device based on instructions received from a computing system over the communications network.

19. The method of claim 16, further comprising automatically adjusting an operation of the unit of building equipment in response to determining that the trend satisfies the criterion.

20. The method of claim 16, wherein the one or more streams of vibration data have a frequency greater than fifteen thousand Hertz.

* * * * *